(12) United States Patent
Aymeloglu et al.

(10) Patent No.: US 8,041,714 B2
(45) Date of Patent: Oct. 18, 2011

(54) FILTER CHAINS WITH ASSOCIATED VIEWS FOR EXPLORING LARGE DATA SETS

(75) Inventors: Andrew Aymeloglu, Palo Alto, CA (US); Kevin Simler, Fremont, CA (US); Brandon Burr, Palo Alto, CA (US); Garry Tan, Mountain View, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 471 days.

(21) Appl. No.: 12/210,921

(22) Filed: Sep. 15, 2008

(65) Prior Publication Data

US 2010/0070489 A1 Mar. 18, 2010

(51) Int. Cl.
*G06F 17/30* (2006.01)

(52) U.S. Cl. ........ 707/726; 707/754; 715/700; 715/764; 715/781

(58) Field of Classification Search .................. 707/609, 707/726; 345/619; 719/310, 231, 328; 715/700, 715/764, 781
See application file for complete search history.

(56) References Cited

U.S. PATENT DOCUMENTS

| | | | | | |
|---|---|---|---|---|---|
| 6,072,942 | A | * | 6/2000 | Stockwell et al. | 709/206 |
| 6,104,401 | A | * | 8/2000 | Parsons | 715/804 |
| 6,662,202 | B1 | * | 12/2003 | Krusche et al. | 718/101 |
| 7,133,409 | B1 | * | 11/2006 | Willardson | 370/401 |
| 2002/0099870 | A1 | * | 7/2002 | Miller et al. | 709/328 |
| 2002/0147671 | A1 | | 10/2002 | Sloan et al. | |
| 2003/0184588 | A1 | | 10/2003 | Lee | |
| 2005/0060712 | A1 | * | 3/2005 | Miller et al. | 719/310 |
| 2005/0060713 | A1 | * | 3/2005 | Miller et al. | 719/310 |
| 2005/0108001 | A1 | * | 5/2005 | Aarskog | 704/10 |
| 2006/0020398 | A1 | * | 1/2006 | Vernon et al. | 702/20 |
| 2007/0226617 | A1 | | 9/2007 | Traub et al. | |
| 2007/0282951 | A1 | * | 12/2007 | Selimis et al. | 709/205 |
| 2009/0313250 | A1 | * | 12/2009 | Folting et al. | 707/7 |

FOREIGN PATENT DOCUMENTS

EP 1109116 A1 6/2001

OTHER PUBLICATIONS

Bradbard, Matthew, "Technical Analysis Applied", FutureSource.com, Sep. 5, 2007.
Notification of International Search Report and Written Opinion, PCT/US2009/056705, Mar. 26, 2010.
Current Claims, PCT/US2009/056705.

* cited by examiner

*Primary Examiner* — Hanh Thai
(74) *Attorney, Agent, or Firm* — Hickman Palermo Truong & Becker LLP

(57) ABSTRACT

In an embodiment, a filter chain object comprising an association of a starting set of data items and two or more filter links is created and stored in computer memory. Each of the filter links comprises a component object that associates a set operation and a membership criterion. Each of the filter links is associated with a particular filter view among a plurality of filter views. Each particular filter view comprises a graphical representation of a state of applying the membership criterion of the associated filter link to a subset of data resulting from filtering the starting set of data items according to zero or more preceding filter links.

49 Claims, 15 Drawing Sheets

| Fitlered Instruments | | | | | | | |
|---|---|---|---|---|---|---|---|
| | | | 📋 Copy table to clipboard  Create new: 🔗 Static Group ⚡Index ☐ Portfolio I ☐ Pop out | | | | |
| Name | Ticker | Last | Change | Sigma | Last Ticked On | Percentage Move Over P/E | |
| Abbott Laboratories | ABT | 55.57 | 0.1 ↑ | 0.14 Sigma | | 0.0174 | |
| Aetna Inc | AET | 52.26 | 0.43 ↑ | 0.54 Sigma | | -0.0696 | |
| Allergan Inc/United States | AGN | 63.43 | 0 | 0 Sigma | | -0.0614 | |
| AmerisourceBergen Corp | ABC | 43.38 | -0.22 ↓ | -0.31 Sigma | | -0.0792 | |
| Amgen Inc | AMGN | 47.82 | 1.07 ↑ | 1.4 Sigma | | -0.1771 | |
| Angiotech Pharmaceuticals Inc | ANP | 3.17 | 0.05 ↑ | 0.38 Sigma | | -0.3018 | |
| Applera Corp – Applied Biosystem... | ABI | 33.43 | 0.57 ↑ | 1.15 Sigma | | -0.0999 | |
| Axcan Pharma Inc | AXP | 23.24 | -0.45 ↓ | -0.72 Sigma | | 0.1949 | |

*FIG. 3B-2*

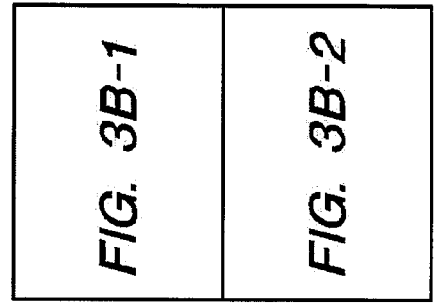

*FIG. 3B*

FILTER CHAINS WITH ASSOCIATED VIEWS FOR EXPLORING LARGE DATA SETS

FIELD OF THE DISCLOSURE

The present disclosure generally relates to techniques for exploring large data sets, for example, as related to market instruments.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data analysts in the financial services industry often perform analysis of a large collection of data items, such as data relating to market instruments. In many instances, the amount of raw data about data items can be massive and dynamically increasing all the time. For example, instruments may be daily traded in large volumes and numerous times. Therefore, in addition to metadata that captures relatively stable aspects of the instruments, a huge amount of raw trading data may be accumulated over a particular period of time, such as the past six months.

While an instrument can possibly be analyzed based on raw trading data, it is often difficult to make sense of the raw trading data, metadata, or related computations. This problem is drastically compounded when analyzing a large collection of instruments, because numerous factors influence trading of the instruments in numerous different ways. Thus, an analyst often is forced to rely on inexact hunches, experience, and cumbersome spreadsheets to make forecasts relating to instruments.

SUMMARY

In an embodiment, a computer-implemented method comprises creating and storing in computer memory a filter chain object comprising an association of a starting set of data items and two or more filter links. Here, each of the filter links comprises a component object that associates a set operation and a membership criterion.

In a feature of this embodiment, in the computer-implemented method, each of the filter links is associated with a particular filter view among a plurality of filter views. Each particular filter view comprises a graphical representation of a state of applying the membership criterion of the associated filter link to a subset of data resulting from filtering the starting set of data items according to zero or more preceding filter links.

In a further aspect of this feature, the computer-implemented method further comprises receiving user input representing an interaction with a first particular filter view, and modifying the membership criterion that is associated with the first particular filter view in response to the user input. Additionally and optionally, in the computer-implemented method, the first particular filter view comprises a histogram view that is associated with a histogram filter link, wherein the user input comprises a selection of a range of an axis of the histogram view, and wherein the modifying comprises changing the membership criterion of the histogram filter link to comprise the selected range.

In this feature, in the computer-implemented method, the particular filter view is a histogram view, a scatterplot view, a timeline view, a percentile view, a treemap view, a spectrum view, or a list view. In some embodiments, a list view is associated with a list filter link and comprising a graphical display of a bar or a number for each data item in a list shown in the list view. Each bar or number may represent a quantity of each of the data items in the list. The particular filter view may also be a smudges view in which the bar has a color saturation level that is proportional to the magnitude of the quantity.

In an embodiment, the computer-implemented method further comprises receiving second user input that defines the set operation, the membership criterion, or the graphical representation.

It should be noted that the data items that are in the starting set of data items may change over time. The data items may represent tradable financial instruments.

In an embodiment, in the computer-implemented method, each filter link is associated with a table of a second subset of the data items resulting from filtering the starting set of data items according to all the filter links.

Other embodiments may comprise a system and one or more machine-readable media operable to provide the foregoing graphical user interface and/or to perform or cause the performance of the foregoing computer-implemented methods.

BRIEF DESCRIPTION OF THE DRAWINGS

FIG. 3I illustrates an example graphical user interface related to a spectrum filter.

DESCRIPTION OF EXAMPLE EMBODIMENTS

Figure 1:
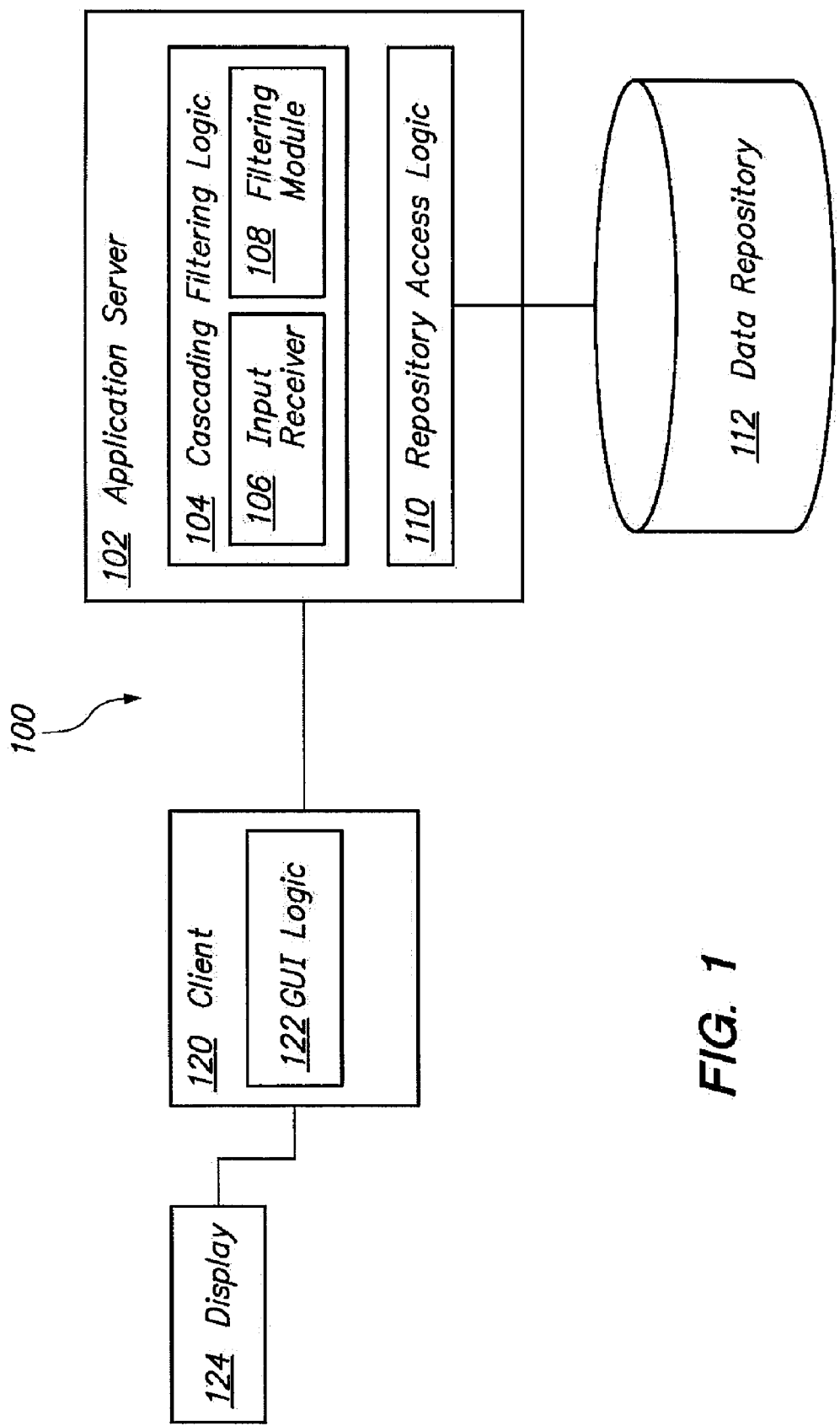
FIG. 1 illustrates an example system for generating time series.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1 Glossary of Terms

In this disclosure, the following terms have the following meanings.

Metric: a type of transformation that may be applied to a data item to produce information about the data item. For example, a metric performs a type of transformation specified using an instrument as input, and produces a time series.

Data item: an entity that can be described by a number of metrics, as defined above. These metrics may comprise relatively stable metrics along a dimension such as time and a number of measurable metrics that are dynamic along the same dimension. Values of the relatively stable properties of a data item constitute metadata. Values of the measurable properties of a data item constitute measured data along a certain dimension, say time. Examples of measurement data include, but are not limited to, one or more sequences of measurements (e.g., raw measurement data) on one or more of the measurable properties. The data analysis system may determine a plurality of metrics for a data item based on the sequences of measurements. In an embodiment, a data item may be represented by a combination of metadata, sequences of measurements, and metrics based on the sequences of measurements.

Data set: a starting set of data items for a filter chain, a universe of data items, a result set from one or more prior filtering operations performed on the universe of data items, or a subset in the universe of data items.

Filter: a) may refer to a filter link that can be selected by a user to be a part of a filter chain; and b) may alternatively refer to a filter view that provides a display of results of an evaluation of the filter chain. In some embodiments, a filter view can be used to modify an existing filter that is within the filter view.

Filter chain: an object that consists of a starting set of data items, such as instruments and a set of zero or more filter links.

Filter link: a component object that consists of a set operation and a membership criterion. A filter link may be one of many in a filter chain.

Filter view: a view of results of an evaluation of a existing filter chain. Each filter link in the filter chain can have a filter view associated with it. Filter views are paired 1:1 with filter links. An individual filter view gives some graphical representation of some internal state of the computation involved in applying the membership criterion in the filter link to a set of data items that has made it to the filter link in question (which has passed all the previous filter links in the chain). The user can interact with the view associated with a particular filter link in order to change membership criterion for the particular filter link. For example, a histogram view shown in FIG. 3B is a view attached to the Histogram filter, and by clicking and dragging to select ranges along the x-axis of the histogram view, one actually changes the membership criterion for that filter.

Frame: a graphical representation object that is configurable to include one or more GUI components. Examples of frames include, but are not limited to, dialog boxes, forms, and other types of windows or graphical containers.

Graphically demarcated area: a bounded area on a graphic user interface. In some embodiments, a graphically demarcated area may be implemented as a window, a frame, or a content pane that is separate and apart from a portion of GUI that concurrently displays a list view, a table view, or a tree view, of data items. Examples of a graphically demarcated area also include a specific portion of a display on a handheld computing device.

Market instrument or instrument: a tradable element that has some kind of value. For example, stocks, bonds and derivatives thereof (e.g. stock options, bond futures, mutual funds) may be represented as instruments that can be traded on stock markets and/or exchanges. The trading of such an instrument may occur online, in an exchange, or via other suitable venues.

Membership criterion: a function that selects a set of instruments.

Starting set of instruments: simply a set of instruments that can be specified independent of the rest of the filter chain. This can be the "universe" of all the instruments known to a system, or it can be the 500 stocks in the S&P 500 Index, or it can be the empty set.

Universe of data items: a set of data items that is known to a data analysis system.

2 Data Analysis System Overview

FIG. 1 illustrates an example data analysis system for analyzing a universe of data items. Data analysis system 100 comprises application server 102 and one or more clients, such as client 120.

Figure 4:
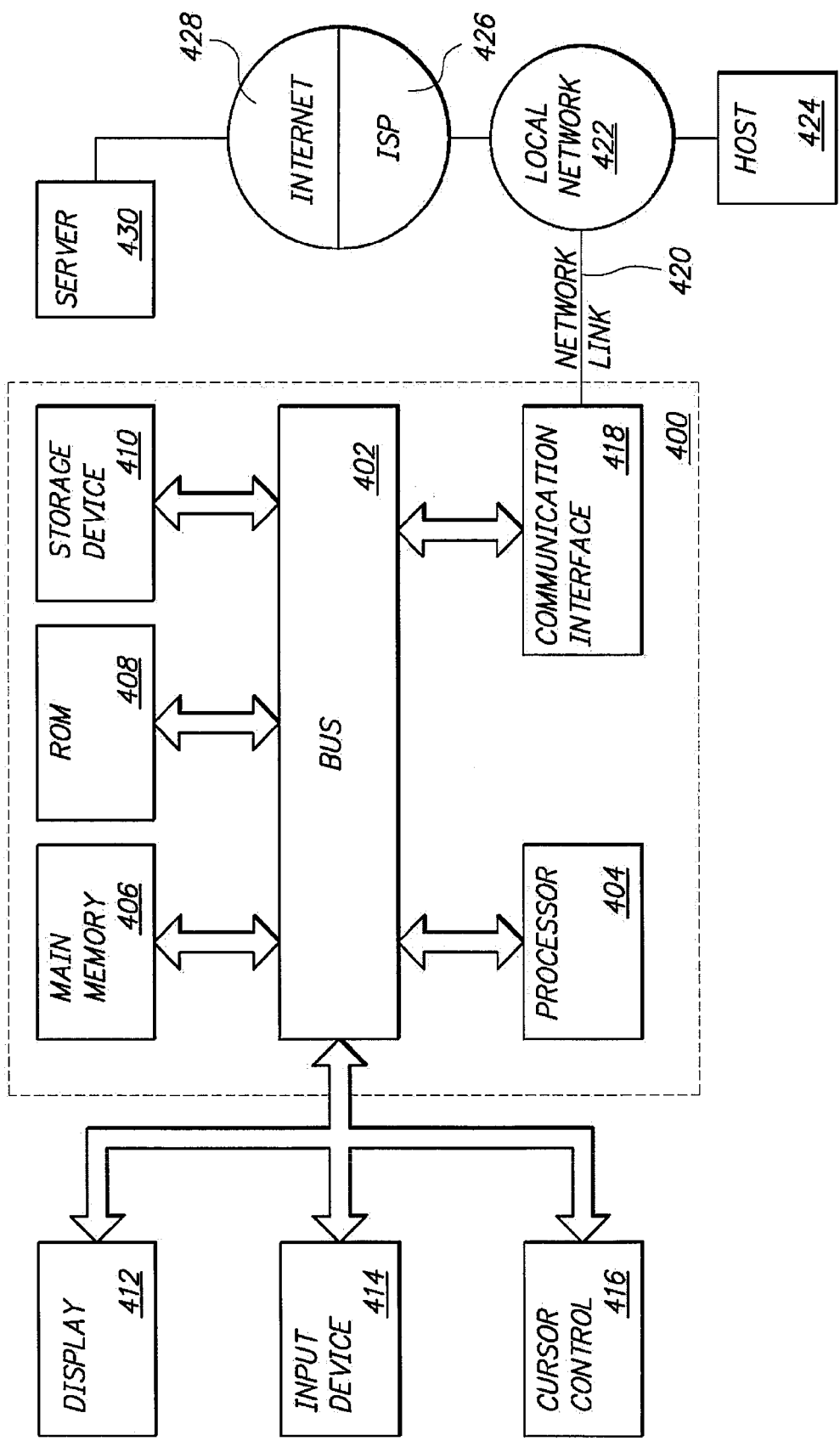
FIG. 4 illustrates a computer system with which an embodiment may be implemented.

In the embodiment illustrated in FIG. 1, client 120, which may be implemented by one or more first physical computing devices, is communicatively connected to application server 102, which may be implemented by one or more second physical computing devices, over a network. In some embodiments, each such physical computing device may be implemented as a computer system as shown in FIG. 4. For example, client 120 may be implemented in a computer system as a set of program instructions recorded on a machine-readable storage medium. Client 120 comprises graphical user interface (GUI) logic 122. GUI logic 122 may be a set of program instructions which, when executed by one or more processors of the computer system, are operable to receive user input and to display a graphical representation of analytical results of a universe of data items using the approaches herein. GUI logic 122 may be operable to receive user input from, and display analytical results to, a graphical user interface that is provided on display 124 by the computer system on which client 120 executes.

In some embodiments, GUI logic 122 is omitted. For example, in one embodiment, client 120 may comprise an application program or process that issues one or more function calls or application programming interface (API) calls to application server 102 to obtain information resulting from, to provide input to, and to execute along with application server 102, the processes or one or more steps thereof as described herein. For example, client 120 may request and obtain filtered data, filter chains, sets and other data as described further herein using a programmatic interface, and then the client may use, process, log, store, or otherwise interact with the received data according to local logic. Client 120 may also interact with application server 102 to provide input, definition, editing instructions, expressions related to filtered data, filter chains, sets and other data as described herein using a programmatic interface, and then the application server 102 may use, process, log, store, or otherwise interact with the received input according to application server logic.

Application server 102 may be implemented as a special-purpose computer system having the logical elements shown in FIG. 1. In an embodiment, the logical elements may comprise program instructions recorded on one or more machine-readable storage media. Alternatively, the logical elements may be implemented in hardware, firmware, or a combination.

When executed by one or more processors of the computer system, logic in application server 102 is operable to analyze the universe of data items according to the techniques described herein. In one embodiment, application server 102 may be implemented in a Java Virtual Machine (JVM) that is executing in a distributed or non-distributed computer system. In other embodiments, application server 102 may be implemented as a combination of programming instructions written in any programming language (e.g. C++ or Visual Basic) and hardware components (e.g. memory, CPU time) that have been allocated for executing the program instructions.

In an embodiment, application server 102 comprises repository access logic 110 and cascading filtering logic 104. Repository access logic 110 may comprise a set of program instructions which, when executed by one or more processors, are operable to access and retrieve data from data repository 112. For example, repository access logic 110 may be a database client or an Open Database Connectivity (ODBC) client that supports calls to a database server that manages data repository 112. Data repository 112 may be any type of structured storage for storing data including, but not limited to, relational or object-oriented databases, data warehouses, directories, data files, and any other structured data storage.

In an embodiment, cascading filtering logic 104 is operable to retrieve an existing filter chain based on prior saved information or prior user selections, receive new user selection of membership criteria and set operations from a client, create a new filter chain based on the user selection and the existing filter chain, create a new instrument group based on the new filter chain, and generate a filter view that may be operated on by a user of a client. In the embodiment illustrated in FIG. 1, cascading filtering logic 104 comprises input receiver 106 and filtering module 108. Cascading filtering logic 104 may be object-oriented logic. As used herein, the universe of data items can be accessed and/or operated by the cascading filtering logic 104 to generate the analytical results.

In an embodiment, input receiver 106 is a set of program instructions which, when executed by one or more processors, are operable to receive input, including user selection of membership criteria and set operations, from a client.

Filtering module 108 is a set of program instructions that implement logic to create filter chains based on membership criteria and set operations and apply the filter chains to a universe of data items to create filter views that may be provided to a client. Filter views may also be rendered by GUI logic 122 on display 120.

3 Analyzing Data Items Using Filters

In an embodiment, a data item may be a market instrument; thus a universe of data items may be a large collection of market instruments. The data analysis system may keep collected and/or computed information about a large number of data items, and may allow a user to designate a starting set of data items from the universe of data items. For example, the universe may comprise all the instruments traded on public exchanges in the world, or a part thereof such as instruments included in S&P 500.

For the purpose of illustrating a clear example, a data item has been described as an instrument. However, in other embodiments, other examples of data items may be used instead of instruments. For example, other types of data items include job seekers in a human resource system or human beings in a sociological system that describes a particular community or tribe.

3.1 Example Graphical User Interface

For purposes of clearly illustrating how the functions described herein operate upon data, the following sections describe example graphical user interface displays. However, the GUI displays described herein represent only selected examples of visualizations for the data manipulation operations and data transformations that are described herein. Thus, the disclosure broadly encompasses any method of performing the filter operations, filter chain operations, and other data transformations and data manipulation operations that are described herein.

Further, no particular GUI is required and the disclosure is intended to encompass the data manipulation operations and transformations that are described independent of any GUI, and is not intended to be limited to any particular GUI or other form of display. For example, each example GUI merely represents one way to receive data input from a user for the data elements, parameters and values that are shown in the GUI, and represents only one way to display output resulting from the transformations and manipulations described herein; in other embodiments, programmatic methods may be used to obtain the same data elements, parameters and values and other forms of data output may be used such as logging, reporting, storing in database tables, storing in spreadsheets, or output using the GUI of another program or process. Moreover, as described above, in some embodiments no graphical user interface is used at all.

Figure 3A:
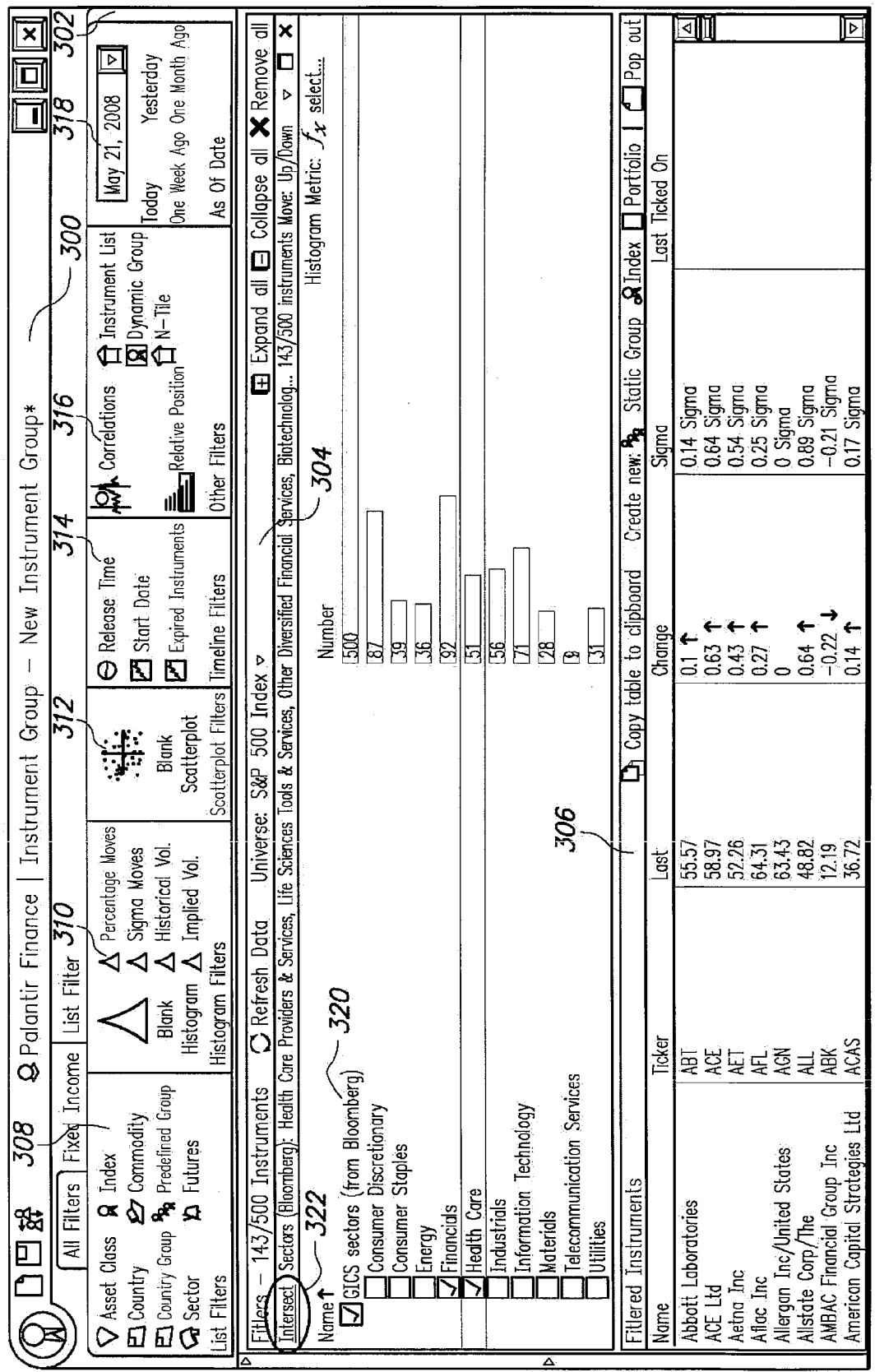
FIG. 3A illustrates an example graphical user interface for a sector filter.
Figures 1, 3B:
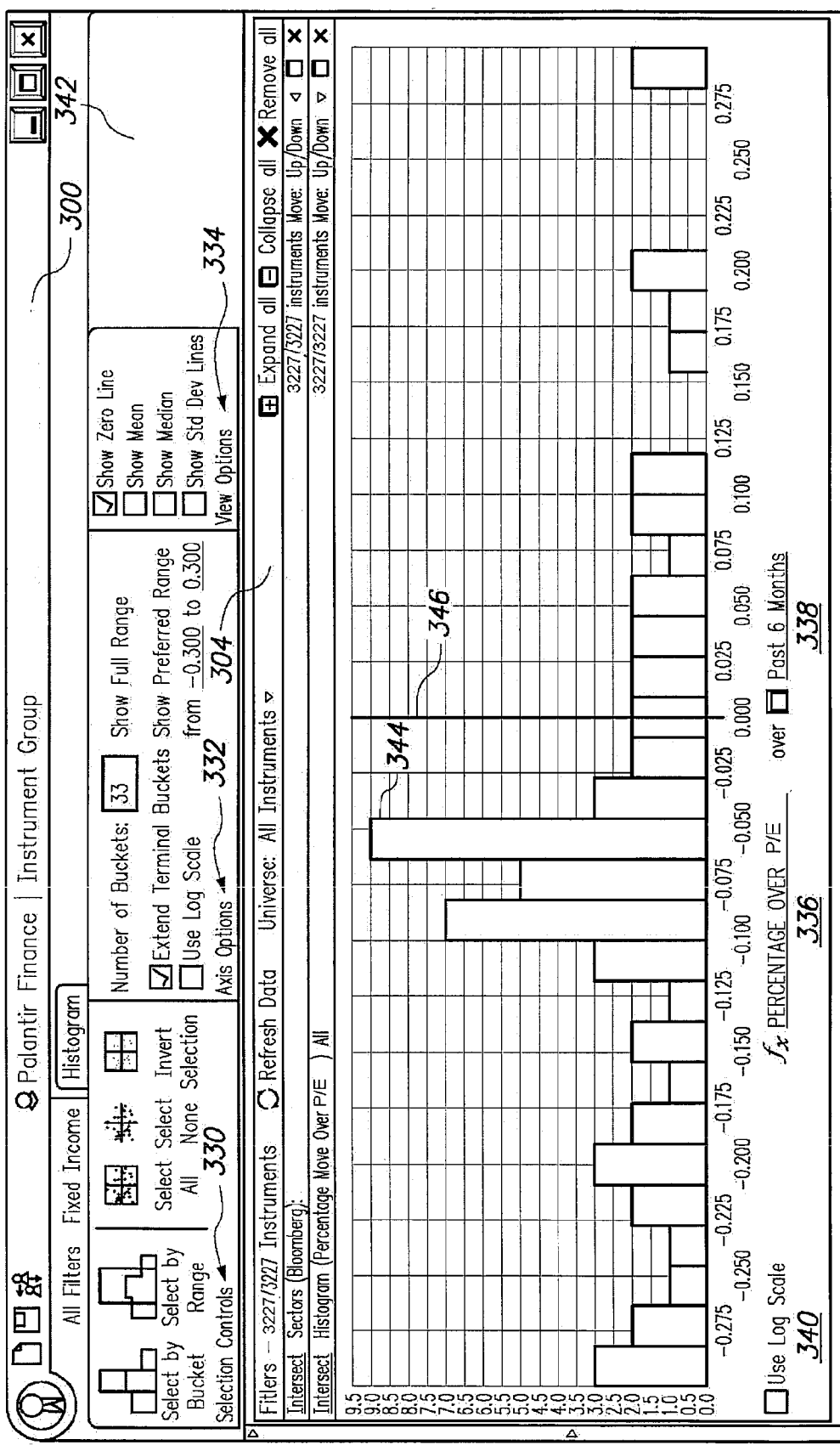
FIG. 3B illustrates an example graphical user interface for a histogram filter.

FIG. 3A illustrates an example of a graphical user interface 300 that may be used to receive user input and to display representations of a universe of data items, or filter views of the universe of data items. In an embodiment, the graphical user interface may be implemented as a set of program instructions which, when executed by one or more processors, are operable to render the graphical user interface on the display of a computer system.

In some embodiments, the set of program instructions operable to generate the graphical user interface may be included in a standalone application, which is also operable to perform the techniques described herein for analyzing universes of data items. In some embodiments, the set of program instructions operable to generate the graphical user interface may be included in a client component of a client-server application, where the server component of the client-server application is operable to perform analyses of universes of data items as described herein. In some embodiments, the set of program instructions operable to generate the graphical user interface may be included in a server or service, where the server or service is operable to analyze a universe of data items and to communicate instructions for rendering the graphical user interface and graphical representations of analytical results to a client which in turn is operable to display the graphical user interface on a display.

In the example embodiment illustrated in FIG. 3A, graphical user interface 300 comprises a plurality of graphic components including a control area 302 and two content panes 304, 306. As used herein, graphic components may be included in frames.

3.2 Filters

In the example of FIG. 3A, under a tab denoted "All Filters", control area 302 may comprise one or more control panes 308, 310, 312, 314, 316. Control area 302 may additionally contain a parameter area 318 to accept one or more parameters, depending on the current context of the GUI display. Graphic components in other parts of the GUI display may also be used to accept parameters from a user.

Control pane 308 on control area 302 comprises one or more list filters. For example, a list filter of the "Asset Class" type can be used to select instruments from a particular asset class. Similarly, a "Country" filter can be used to select instruments from a particular country. A "Country Group" filter can be used to select instruments from a group of countries, such as, for example, the top 7 industrialized nations, or top 4 largest developing countries, or European Union countries. A "Sector" filter can be used to select instruments from a particular sector, such as, for example, a semiconductor industry sector, or a mining industry sector. A "Commodity" filter can be used to select instruments from one or more commodities, such as agricultural commodities or metal commodities. A "Predefined Group" filter can be used by a user to select any specific instruments to form one or more predefined groups of instruments. A "Futures" filter can be used to select instruments that are related to futures traded on certain exchanges. Any of the above filters can be selected by the user to specify an appropriate membership criterion as a part of a filter chain.

Filters in control pane 308 are category-based membership criteria. Such a filter may alternatively be referred to as an ontology filter. An ontology filter performs filtering operation based on metadata of a data item. Any of several relatively stable properties of an instrument can be used as basis for filtering. For example, instructions can be filtered based on metadata indicating memberships in various classifications. An ontology filter such as a "Sector" filter may be used to filter instruments based on the instruments' values in a sector property, while another ontology filter such as an "Index" filter may be used to filter instruments based on the instruments' values in an index membership property. Ontology filters may be combined in the same filter chain. For example, a "MSFT" instrument representing stock in Microsoft Corporation may be in the S&P 500 Index classification, as well as in a software technology sector classification.

As illustrated in FIG. 3A, when the "Sector" filter is selected by the user, the user is presented a list of available sectors in content pane 304. The user may click on check-boxes next to names of the sectors to select or de-select a sector. As the user selects or de-selects the sectors, a list of instruments that are in the selected sectors may be displayed in content pane 306. One or more metadata and metrics of each instrument on the list may also be displayed in the listing.

3.3 Set Operations

In an embodiment, filters are not mutually exclusive and more than one filter may be used to create a filter chain. For example, after the user selects the "Sector" filter as a first filter link, assume that the user further selects a second filter, such as the "Index" filter, which categorizes instruments in terms of their membership in various indexes, such as Dow Jones 30 or Nasdaq 100, as a second filter link. The second filter link specifies a new membership criterion that is to be joined with a current filter chain in a set operation to form a filter chain. In some embodiments, label 322 of content panel 304 identifies the set operation that will be used to join a new filter link.

In the example of FIG. 3A, label 322 indicates a set intersection operation. If the "Index" filter is selected specifying one or more indexes after the "Sector" index is selected specifying one or more sectors, a new filter chain is created after the specified membership criterion and the specified set operation are evaluated using the specified set operation. Since the set operation is intersection, the newly selected "Index" filter is joined with the existing filter chain that comprises the previously selected "Sector" filter in an intersection operation. Filtering module 108 may perform the intersection operation and store data for the resulting set. Consequently, the instruments in the new instrument group are those instruments that are in the one or more specified sectors and also in the one or more specified indexes.

Any number of set operations may be used to connect filters in a filter chain of any number of linked filters. As new filter links providing new membership criteria are added or subordinated to an existing filter chain using set operations, the filter chain may be represented in a chain, in which the head of the chain is the current filter chain formed by filter links in one or more levels that are merged together by set operations in a cascading form. Alternatively, a filter chain may be represented in a list or a tree.

4 Example Filter Operations

4.1 First Example Filter Chain

Assume for the purpose of illustrating an example that a filter chain is to be created to select S&P technology company stocks that have gained value during 2008. A starting set of instruments may be all the stocks in the S&P 500 Index. The filter chain may comprise a first filter link and a second filter link. The first filter link may comprise "intersection" as a first set operation and a metric value of "tech sector" as a first membership criterion. This first membership criterion may be implemented as a List Filter with all the sectors displayed in a graphically demarcated area on a user interface, but with only the tech sector selected.

The second filter link may comprise "intersection" as a second set operation and a second membership criterion. The second membership criterion only selects those instruments whose values for a metric "priceChangeOverTime(2008)" are greater than zero. The metric "priceChangeOverTime(2008)" identifies a programmatic object, class or other functional element that can compute the annual return of the specified instrument for the year indicated by the parameter value 2008.

In an embodiment, the filter chain is evaluated as follows. First, gather the 500 S&P stocks into a starting set of instruments. Next, the first membership criterion is applied to the starting set. Since the first membership criterion picks out all stocks in the tech sector, applying the first membership criterion to the entire S&P yields all the tech stocks in the S&P, thereby creating a first matching set of instruments. The first set operation of "intersection" is then applied to the starting set and the first matching set to produce a first set of selected instruments. In this case, the first set is the same as the first matching set. However, the first set does not have to be the same as the first matching set when a different set operation (e.g., a set union operation) or other sets are involved.

For the purpose of illustration, the second membership criterion is applied to the first set. Since the second membership criterion specifies stocks that have gained during 2008, applying the second membership criterion to the first membership criterion yields as a result all tech stocks in the S&P that have gained during 2008, thereby creating a second matching set of instruments. The second set operation of "intersection" is then applied to the first set and the second matching set to produce a second set of selected instruments. In this case, the second set is the same as the second matching set, but this may not hold if another set operation and/or other sets are involved.

4.2 Second Example Filter Chain

To illustrate a second example, assume that a filter chain is to be created to select S&P stocks that are not in the technology sector. A starting set of instruments is all the stocks in the S&P 500 Index. The filter chain may comprise a single filter link. This filter link may comprise a set-subtraction, or exclusion, as a set operation and a metric value of "tech sector" as a membership criterion. The membership criterion, when applied to the starting set, yields all the tech stocks in the S&P, thereby creating a matching set of instruments. The set operation of set subtraction is applied to the starting set and the matching set to produce a resulting set of selected instrument. The resulting set is all the S&P instruments that are not in the tech sector. Unlike the previous example, in this case, the resulting set is not the same as the matching set.

4.3 Filter Views

As previously mentioned, a filter on the control pane may be selected by a user to display results of an evaluation of a filter chain, thereby providing a filter view for all the data items that are included under the filter chain.

For example, consider a filter chain that selects stock instruments in the S&P 500 Index whose values for the metric "priceChangeOverTime(2008)" are greater than zero. A filter view in the form of a histogram (which, for example, may be similar to the one illustrated in FIG. 2B) may be associated with the filter chain. In some embodiments, the histogram may be based on the metric "priceChangeOverTime(2008)". In evaluating the filter chain, the data analysis system 100 determines which instruments from the S&P 500 Index have positive values for the "priceChangeOverTime(2008)" metric by determining values for priceChangeOverTime(2008) for the entire S&P 500 Index, and then selecting instruments with positive values. Once all these values are retrieved and calculated, the data analysis system 100 can produce the filter view in the form of a histogram rendered in the GUI.

5 Example Process Flow

Figure 2:
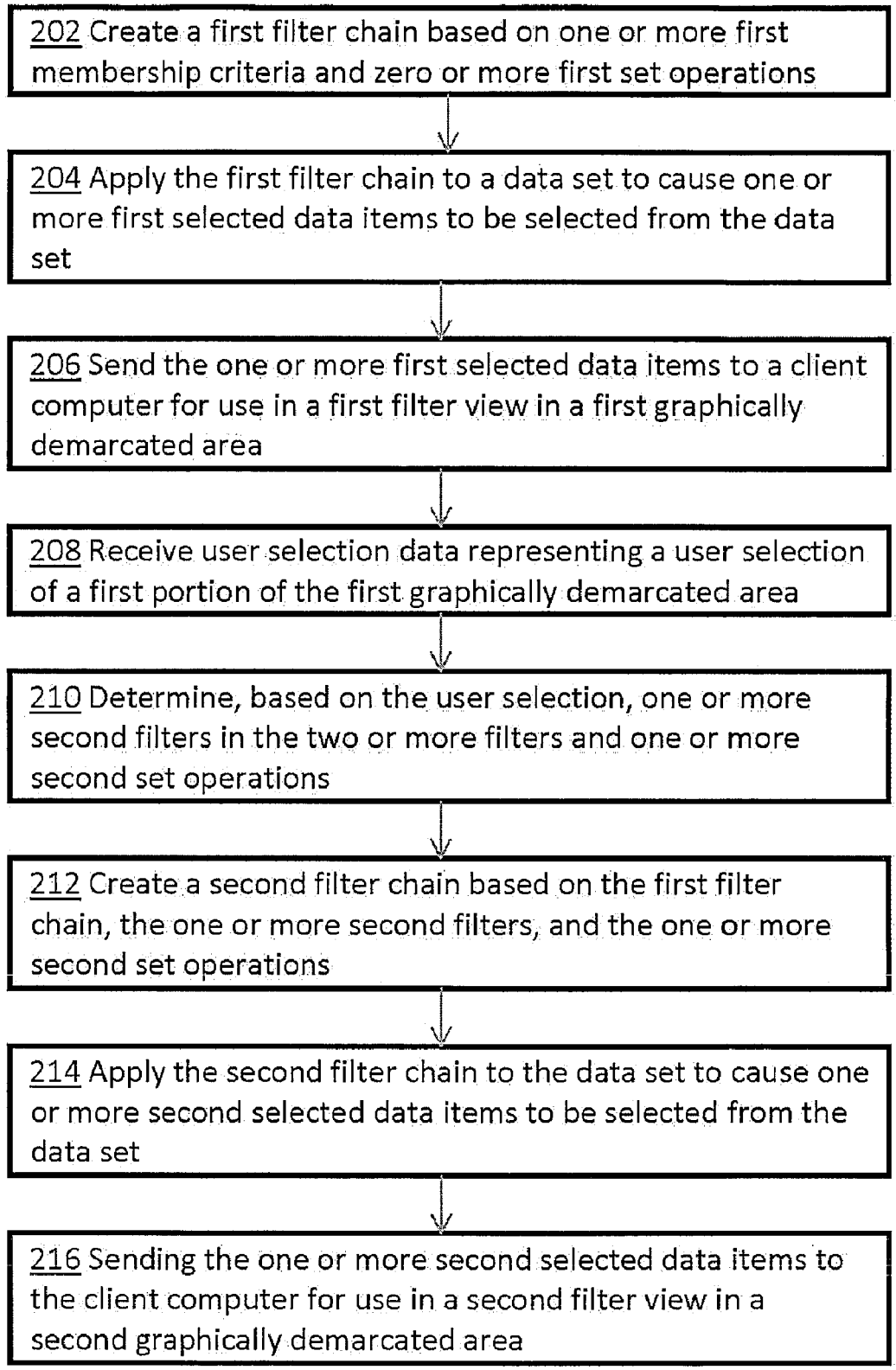
FIG. 2 illustrates an example process flow for analyzing a universe of data items.

FIG. 2 illustrates an example of analyzing a data set. In block 202, the data analysis system 100 creates a first filter chain based on one or more first membership criteria and zero or more first set operations. For example, the first filter chain may be retrieved from the data repository 112 in which the first filter chain has been previously defined and saved.

In block 204, the data analysis system 100 applies the first filter chain to a data set to cause one or more first selected data items to be selected from the data set. For example, the first filter chain may be a list view filter that selects all instruments in the S&P index. In alternative embodiments, zero data items may be returned when the first filter chain is applied to the data set.

In block 206, the data analysis system 100 sends the one or more first selected data items to a client computer for constructing a first filter view in a first graphically demarcated area. For example, the first filter view may be a smudges filter view that displays a "today's performance" metric for all sectors in the S&P Index as described above. The first graphically demarcated area may be a content pane that is separate and apart from a list, table, or tree view that presents a scrollable listing of all instruments.

In block 208, the data analysis system 100 receives user selection data representing a user selection of a first portion of the first filter view. For example, the user may select a particular band in multiple bands of histograms, where the particular band represents a particular sector in the S&P Index. In alternative embodiments, the user may additionally or alternatively enter metric-based criteria in a suitable input means such as a text field entry. For example, the user may specify in a text field entry indicating a criterion of have positive values for the "priceChangeOverTime(2008)" metric.

In block 210, the data analysis system 100 determines, based on the user selection, one or more second membership criteria in the two or more membership criteria and one or more second set operations. For example, this one or more second membership may comprise a membership criterion that an instrument must be in the selected sector and another membership criterion that the instrument must have a positive value for the "priceChangeOverTime(2008)" metric.

In block 212, the data analysis system 100 creates a second filter chain based on the first filter chain, the one or more second membership criteria, and the one or more second set operations. For example, this filter chain comprises two filter links, with the filter link selecting all the instruments in the S&P Index and the second filter link selecting only those instruments in the selected sector with positive values for the "priceChangeOverTime(2008)" metric.

In block 214, the data analysis system 100 applies the second filter chain to the data set to cause one or more second selected data items to be selected from the data set. In block 216, the data analysis system 100 sends the one or more second selected data items to the client computer for constructing a second filter view in the first graphically demarcated area. For example, this second filter view may be a histogram filter view that displays positive values for the "priceChangeOverTime(2008)" metric for the selected sector in the S&P Index as described above. In alternative embodiments, zero data items may be returned when the second filter chain is applied to the data set.

6 Example Filter Views 6.1 Histogram Filters

FIG. 3B illustrates an example graphical user interface for a histogram filter. For purposes of illustrating an example, assume that the starting set is all the instruments in data repository 112, and the user has selected the "Sector" filter. As a result, an instrument group that comprises 3227 instruments is created. As shown in control pane 310 of FIG. 3A, histogram filters may be selected by the user to create a histogram filter view of the instrument group created. Other than the "Blank Histogram Filter," the histogram filters may be preset with metrics, as indicated by their names in the illustrated embodiment, that are to be used in the corresponding filter views.

If the user selects the "Blank Histogram" filter, in response, GUI logic 122 may present an input mechanism, for example, on content pane 304 to allow the user to specify a metric to be used in the histogram filter view. Alternatively, GUI logic 122 may first render the histogram filter view with a default metric set by the data analysis system 100. The user may thereafter choose a different metric for the histogram filter. In other embodiments, other elements of the system may receive input for a histogram filter and generate output.

As an example, assume that the metric selected is "PERCENTAGE OVER P/E" as indicated by metric link 336. For the purpose of illustration, the time region is specified as "Past 6 Months" as indicated by time region link 338, relative to a certain date that is selectable by the user.

As illustrated in FIG. 3B, a histogram filter view is rendered in content pane 304 with the metric along the horizontal axis. A filter parameter pane 342 may also be displayed to the user for the purpose of selecting, modifying or inputting parameters related to the histogram filter. In some embodiments, this filter parameter pane 342 may be displayed along with the content of control area 302. Thus, in this embodiment, other membership criteria may be accessed on control area 302. In alternative embodiments, filter parameter pane 342 may replace the content of control area 302 of FIG. 3A, as shown in FIG. 3B.

In an embodiment, a histogram filter view consists of a plurality of logical buckets for data values. Each of the buckets is associated with a unique, non-overlapping region of values of the metric. For example, the bucket 344 is associated with a region of values of the metric that is between −0.0727 and −0.545.

Each instrument in the current instrument group is assigned to one of the buckets based on the instrument's value of the selected metric. For example, if an instrument has a value −0.070 of the select metric, the instrument will be assigned to bucket 344. When all the instruments in the current instrument group have been assigned to their respective buckets, the number of each such bucket is determined and referred to as a frequency value of that bucket.

The height of a bucket as displayed in the histogram filter view as illustrated in FIG. 3B may be determined based on the frequency value of the bucket. For example, the height may be linearly, logarithmically, or analytically dependent on the frequency value.

Axis options 332 may be used to set one or more options for axes used in the histogram. For example, the number of buckets that are to be used for counting frequencies may be set in one of the one or more options. Similarly, a range of values for the selected metric may be set in another of the one or more options. A "Use log Scale" in axis options 332 and a related graphic component 340 in content pane 304 may be set to use a log scale instead of a linear scale where, for example, frequencies vary widely in magnitude. A log scale may be used for the x-axis, when values of the metric associated with the x-axis vary widely in magnitude. Similarly, a log scale may be used for the y-axis when y values vary widely.

View options 334 may be used to set one or more options in viewing the histogram. For example, when a "Show Zero Line" option is selected in view options 334, a line 346 is shown in the histogram to indicate where the metric is zero. Similarly, other indications such as mean, medium, or standard deviation may be selected to be shown in the histogram. In some embodiments, there are differences in graphic attributes of the indications to promote clarity.

In an embodiment, the user may interact with a filter view as presented in a graphically demarcated area to modify the instrument group. For the purpose of illustration, for the histogram filter view in content pane 304, the user can control this interaction using selection controls 330 of FIG. 3B. For example, the user may specify a "Select by Bucket" option and may use a pointing device to select one or more buckets of a histogram filter view. Data representing this user selection may be sent to the cascading filtering logic 104. The user selection indicates a newly specified bucket range filter is to be added to the current filter chain using a set operation currently in effect. This newly specified bucket range filter specifies a new membership criterion that values of instruments in the histogram metric ("PERCENTAGE OVER P/E" for "Past 6 Months") must fall within the range of one or more selected buckets. The cascading filtering logic 104 may create a new filter chain by applying the set operation that is currently in effect, such as "intersection," and the newly specified bucket range filter, as indicated in the user selection data. This new filter chain may be applied to create a new instrument group and a new filter view that comprises only those histogram buckets that have been selected.

In addition to the "Select by Bucket" option, the user may optionally and/or additionally select a different option such as "Select by Range", "Select All", "Select None", or "Invert Selection", for the purpose of manipulating the histogram filter view, as illustrated in Selection Controls 330 of FIG. 3B.

6.2 Scatterplot Filters

Like histogram filters, scatterplot filters may also be selected by the user to create filter views of the current instrument group. For the purpose of illustrating a clear example, assume that the user selects the "Blank Scatterplot" filter in control pane 312 of FIG. 3A. In response, GUI logic 122 may present an input mechanism, for example, on content pane 304 to allow the user to specify an x-axis metric and a y-axis metric to be used in the scatterplot filter view. Alternatively, GUI logic 122 may first render the scatterplot filter view with default x-axis metric and y-axis metrics that are set by the data analysis system 100. The user may thereafter choose different metrics for the scatterplot filter.

Figures 1, 3C:
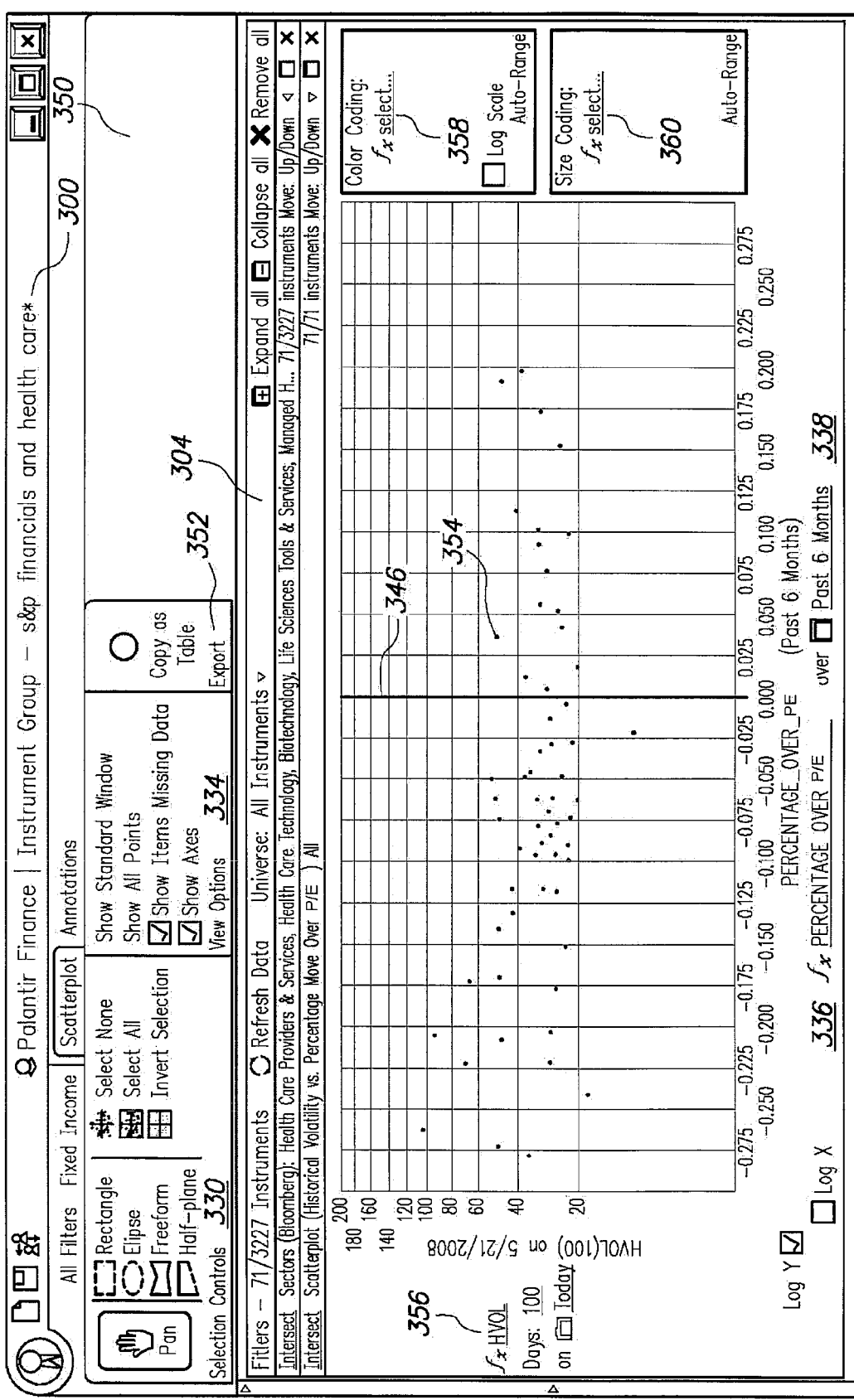
FIG. 3C illustrates an example graphical user interface for a first scatterplot filter.
Figures 1, 2, 3C:
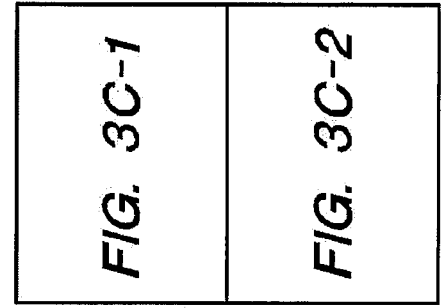

As an example, in FIG. 3C the x-axis metric is "PERCENTAGE OVER P/E" as indicated by link 336, and the time region is specified as "Past 6 Months" as indicated by label 338 relative to a certain date that is selectable by the user, while the y-axis metric selected is historical volatility as indicated by HVOL link 356. A scatterplot filter view is rendered in content pane 304 with these two metrics controlling the coordinates for display of points representing instruments that match the metrics.

A scatterplot filter parameter pane 350 may also be displayed to the user for the purpose of selecting, modifying or inputting parameters related to the scatterplot filter. In some embodiments, scatterplot filter parameter pane 350 may be displayed along with the content of control area 302. Thus, in this embodiment, other membership criteria may continually be accessed on control area 302. In alternative embodiments, scatterplot filter parameter pane 350 may replace the content of control area 302 of FIG. 3A, as shown in FIG. 3C.

A scatterplot filter view consists of a number of discrete points. Each of these points is associated with one or more instruments in the current instrument group. For example, the point 354 is associated with one or more instruments whose metric values match the x and y coordinates of the point in the scatterplot filter view. The x and y coordinates as displayed in the scatterplot filter view as illustrated in FIG. 3C may be determined based on the metric values of each instrument. For example, the coordinates may be linearly, logarithmically, or otherwise analytically dependent on the metric values.

Figures 1, 3D:
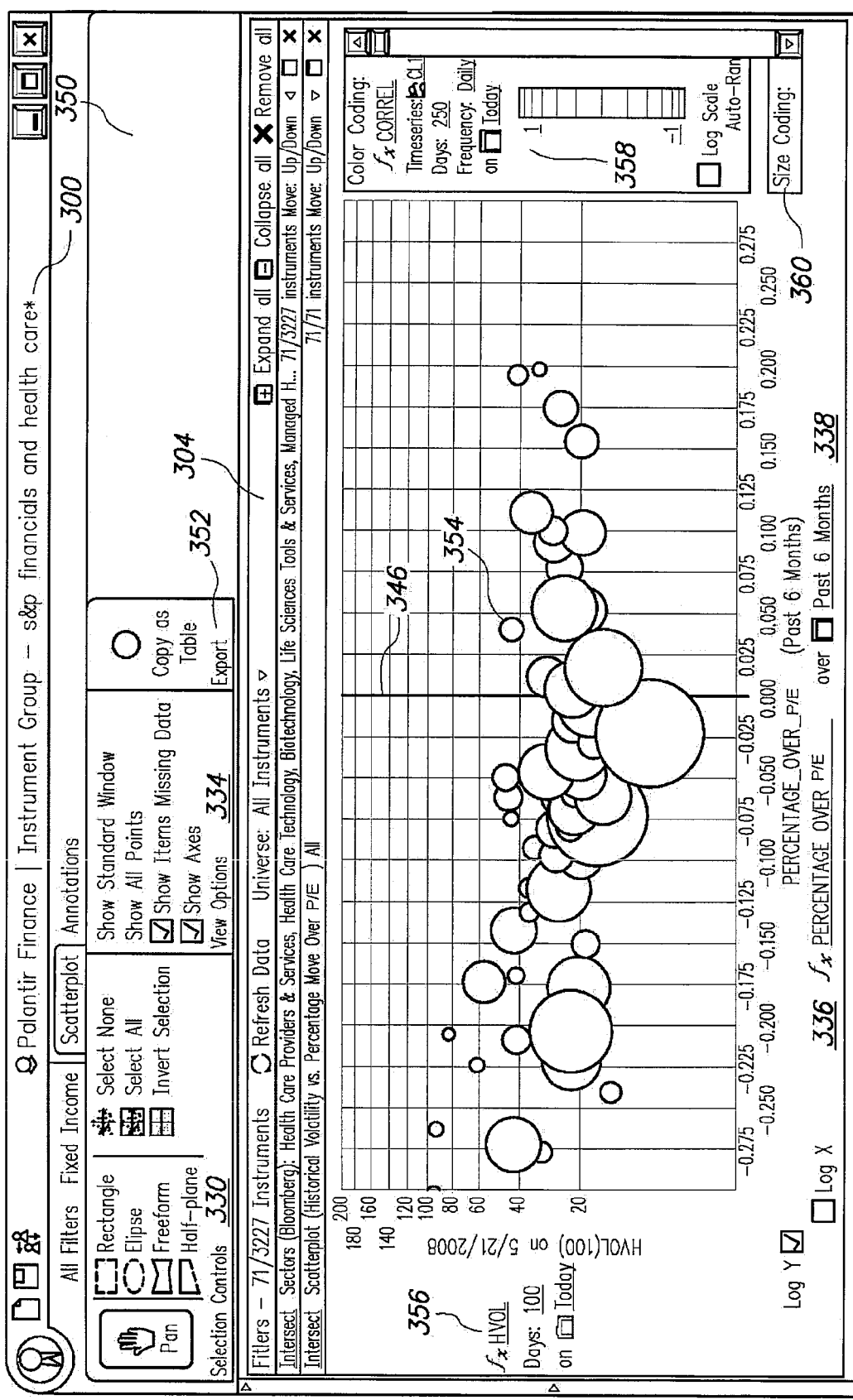
FIG. 3D illustrates an example graphical user interface for a second scatterplot filter.
Figures 2, 3D:
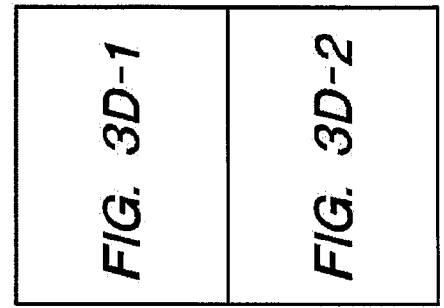

The scatterplot filter view may also represent one, two, or more instrument metrics, in addition to the metrics that correspond to the x and y coordinates. For example, the user may use a control 358 on content pane 304 to select a metric for color coding, and a control 360 to select another metric for size coding. For example, if the user selects a "historical volume" metric of instruments for color coding, then the scatterplot filter view may represent a color saturation level of a point based on a value of this metric for a corresponding instrument. Similarly, if the user selects a "market cap" metric of instruments for size coding, then the scatterplot filter view may represent a size of a point based on a value of this metric for a corresponding instrument, as illustrated in FIG. 3D.

In addition to representing metrics, the x and y coordinates of the scatterplot filter view may represent metadata metrics of instruments in the current instrument group. For example, the x axis may represent the longitude of the globe, while the y axis may represent the latitude of the globe. A world map, or continental map, or a regional map may be represented by or overlaid with the spatial dimensions of the scatterplot filter view. The position of an instrument on this scatterplot filter view may be determined by a place of principal business activities of an entity that the instrument represents. Such a scatterplot can provide insight as to how instruments in a particular geographic area perform. The user may zoom and/or select a particular instrument set from a region of the scatterplot to study the performance of relevant instruments.

View options link 334 may be used to set one or more options in viewing the scatterplot. For example, when a "Show Zero Line" option is selected in view options 334, a line 346 is shown in the scatterplot to indicate where the metric has a zero value.

The user can interact with the scatter filter view in order to view or modify the instrument group. The user can also control this interaction using a number of options in selection controls 330 of FIG. 3C and FIG. 3D. Example options include "Rectangle", "Ellipse", "Freeform", "Pan," or "Half-plane", for manipulating the scatterplot filter view, as illustrated in Selection Controls 330 of FIG. 3C and FIG. 3D. For example, when the user selects "Rectangle", the user may proceed to use a pointer device such as a pen or mouse to specify a rectangle in the scatterplot filter view. For example, the user may perform positioning a mouse to a first position in the scatterplot, holding down a mouse button to signal a starting diagonal position at the first position, dragging the mouse to a second position, and releasing the mouse button to signal an ending diagonal position at the second position. As a result, a rectangle is specified in the scatterplot. Data indicating this range selection may be sent by the client to the cascading filtering logic 104. In response, the cascading filtering logic 104 creates a new instrument group and a new filter view that comprises only those scatterplot points that have been selected. A new filter link that specifies two value ranges, one for x-axis and the other for y-axis, as membership criteria is created. All data items that included in the rectangle of the scatterplot filter view becomes included in the filter chain.

Alternatively, the user may specify a "pan" option. When the pan option is selected, the user may use a pointing device to move a filter view to a different range of x-axis values.

In similar manners, other geometric forms in the scatterplot filter view may be specified by the user using "Ellipse", "Freeform", or "Half-plane" options. As a result, new filter links may be created to cause a new set of data items to be included by the filter chain.

6.3 Timeline Filters

Figure 3E:
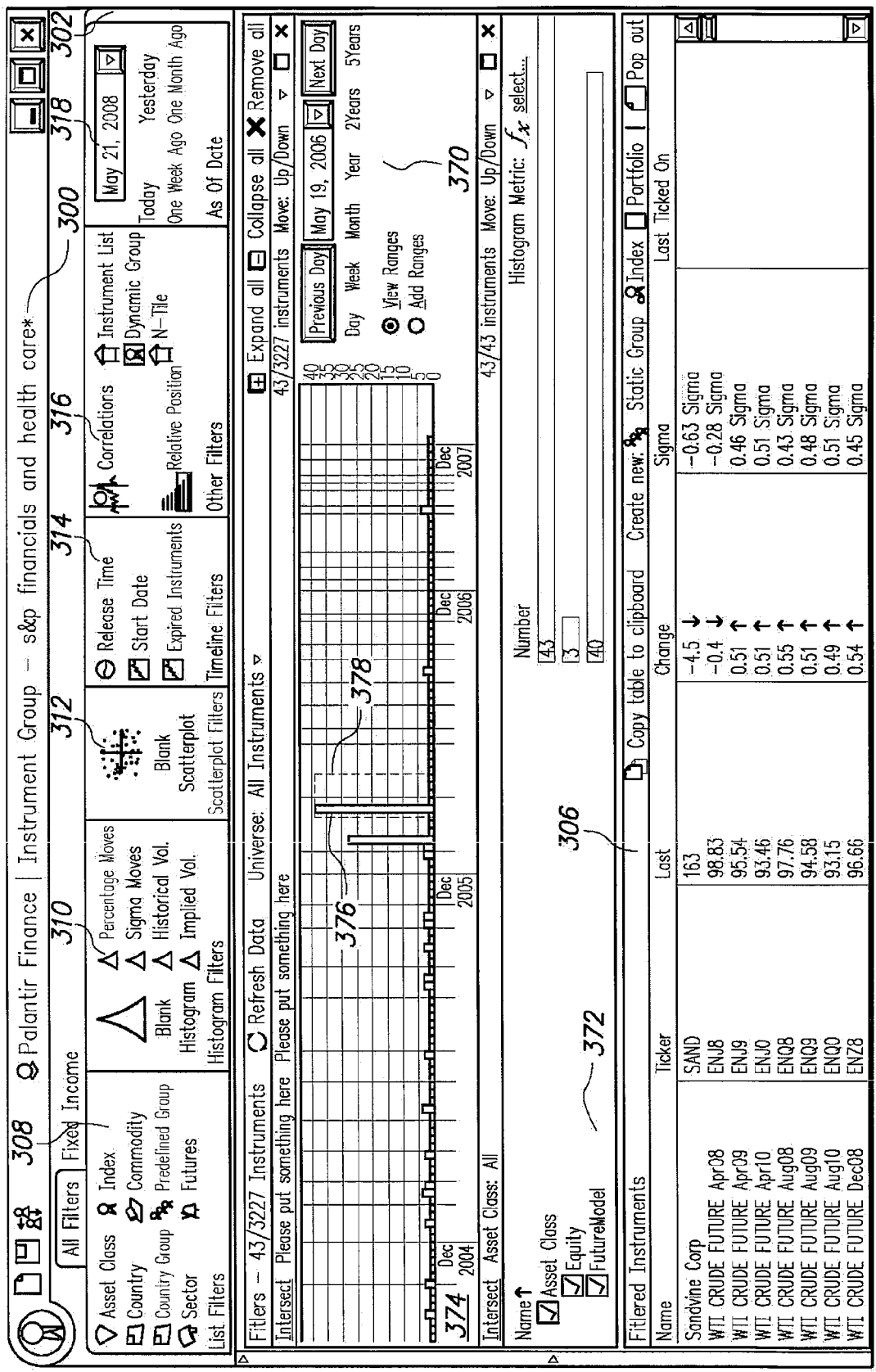
FIG. 3E illustrates an example graphical user interface for a timeline filter.

Timeline filters may be selected by the user to create filter views of the current instrument group based on time-related metrics of the instruments in the instrument group. For the purpose of illustration, the user selects the "Start Date" filter in control pane 314 of FIG. 3A. In response, GUI logic 122 may present an input mechanism, for example, on content pane 304 to allow the user to specify a time range to be used in the timeline filter view. Alternatively, GUI logic 122 may first render the timeline filter view with a default time range set by the data analysis system 100. The user may thereafter choose a different time range for the timeline filter view. As illustrated in FIG. 3E, a timeline filter view is rendered in content pane 304 with a time range.

A timeline filter parameter pane 370 may also be displayed to the user for the purpose of selecting, modifying or inputting parameters related to the timeline filter. For example, a calendar may be displayed in the timeline filter parameter pane 370 for the user to specify a time range that will be used for horizontal axis 324. In some embodiments, this timeline filter parameter pane 370 may be displayed along with the content of control area 302. In an embodiment, other membership criteria may continually be accessed on control area 302.

A timeline filter view consists of a number of buckets. Each of these buckets is associated with a unique, non-overlapping region of a time interval. For example, the bucket 376 is associated with a time interval within February 2005.

Each instrument in the current instrument group is assigned to one of the buckets based on the instrument's start date. For example, if an instrument has a start date of a value within the bucket 376, the instrument will be assigned to that bucket. Consequently, when all the instruments in the current instrument group have been assigned to their respective buckets, the number of each such bucket is determined and referred to as a frequency value of that bucket.

The height of a bucket as displayed in the timeline filter view as illustrated in FIG. 3E may be determined based on the frequency value of the bucket. In other embodiments, the height is not only based on the frequency value of the bucket. For example, the height may depend on a market cap of instruments that fall within the bucket. Other ways of representing heights of buckets may be used in various embodiments.

The user may interact with the timeline filter view as presented in a graphically demarcated area to specify a new membership criterion to modify the instrument group. In various embodiments, different ways may be used to interact with this timeline filter view. For example, the user may use a pointing device to select one or more buckets of a timeline filter view. In the example of FIG. 3E, the user has selected one or more buckets for a time interval 378. As illustrated by graphic component 372, start dates of a total of 43 instruments are in this selected time interval: three for "Equity" instruments and 40 for "FutureModel" instruments, indicating a large number of future-based instruments created in the user selected buckets. Data representing this user selection may be sent to the cascading filtering logic 104. The user selection indicates a newly specified bucket range filter is to be added to the current filter chain using a set operation currently in effect. This newly specified bucket range filter specifies a new membership criterion that start dates of instruments must fall within the range of one or more selected buckets. The cascading filtering logic 104 may create a new filter chain by applying the current set operation of "intersection" and the newly specified bucket range filter, as indicated in the user selection data received. This new filter chain may be applied to create a new instrument group and a new filter view that comprises only those timeline buckets that have been selected.

In addition to the "Select by Bucket" option, the user may optionally or additionally select a different option for the purpose of manipulating the timeline filter view.

6.4 Percentile Filters

Figure 3F:
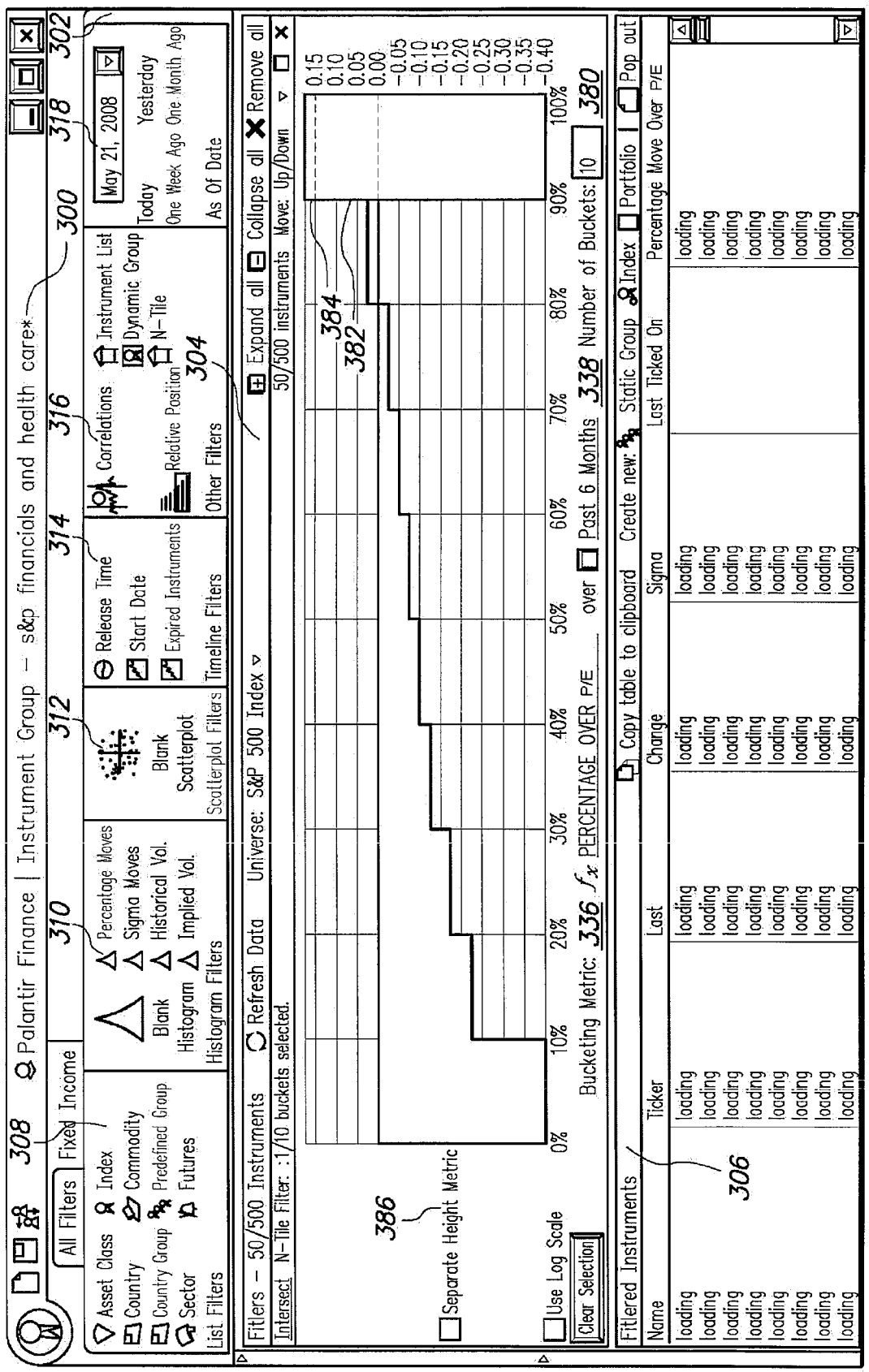
FIG. 3F illustrates an example graphical user interface for an n-tile filter.

Percentile filters, or N-tile filters, may be selected by the user to create filter views of the current instrument group based on time-related metrics of the instruments in the instrument group. For the purpose of illustration, the user selects the "Percentile" filter in control pane 316 of FIG. 3A. In response, GUI logic 122 may present an input mechanism, for example, on content pane 304 to allow the user to specify a number of buckets to be used in the Percentile filter view. Alternatively, GUI logic 122 may first render the Percentile filter view with a default number of buckets set by the data analysis system 100. The user may thereafter choose a different number of buckets for the Percentile filter view. As illustrated in FIG. 3F, a Percentile filter view is rendered in content pane 304 with a number of buckets. A Percentile bucket number input box 380 may also be displayed to the user for the purpose of selecting, modifying or inputting a different number of buckets for the Percentile filter view. In some embodiments, this Percentile bucket number input box 380 may be displayed along with the content of control area 302. Thus, in this embodiment, other membership criteria may continually be accessed on control area 302.

A Percentile filter view consists of a plurality of buckets. Each bucket is associated with a unique, non-overlapping region of a percentile range. Thus, each bucket contains a number of values equal to 100% of the values divided by the number of buckets. For example, where the number of bucket is specified as 10, each bucket contains 10% of the members of a data set. Thus, if the total number of stocks is 500 as in the case of the S&P Index, each bucket of a 10% percentile range contains 50 stocks. As an example, bucket 382 is associated with a percentile range of "top 10%."

Each instrument in the current instrument group is assigned to one of the buckets based on the instrument's percentile ranking in the instrument groups. An instrument's percentile ranking is calculated based on its value of a specified metric, relative to values of the specified metric for other instruments in the current instrument group. For instance, the metric may be specified as "PERCENTAGE OVER P/E" for "Past 6 Months".

For example, if an instrument has a percentile ranking in the instrument groups of a value within a bucket, then the instrument is assigned to that bucket. Thus if the instrument's value in the "PERCENTAGE OVER P/E" metric is top 10% in the instrument group, then the instrument is assigned to bucket 382.

The height of a bucket as displayed in the Percentile filter view as illustrated in FIG. 3F may be determined based on the average value of the specified metric for the instruments of the bucket. Alternatively, the height is not based on the average value of the specified metric for the bucket. The height may depend on a separate height metric, for example, when a user selects a checkbox 386 and specifies a different height metric. For example, a total market capitalization value of instruments that fall within the bucket may be used as a height metric instead of a value related to the specified metric that is used to compute the percentile ranking. These and other ways of representing heights of buckets may be used in various embodiments.

The user may interact with the Percentile filter view as presented in a graphically demarcated area to specify a new membership criterion to modify the instrument group. In various embodiments, many different ways may be used to interact with this Percentile filter view. For example, the user may use a pointing device to select one or more buckets of a Percentile filter view. In the example of FIG. 3F, the user selected one or more buckets for a percentile range 384, which as shown includes one bucket 382. In other embodiments, more buckets may be selected. Data representing this user selection may be sent to the cascading filtering logic 104. The user selection indicates that a newly specified bucket range filter is to be added to the current filter chain using a set operation that is currently in effect. This newly specified bucket range filter specifies a new membership criterion that percentile ranking in the instrument groups of instruments must fall within the range of one or more selected buckets. The cascading filtering logic 104 may create a new filter chain by applying the current set operation of "intersection" and the newly specified bucket range filter, as indicated in the user selection data received. This new filter chain may be applied to create a new instrument group and a new filter view that comprises only those Percentile buckets that have been selected.

In addition to the "Select by Bucket" option, the user may optionally or additionally select a different option for the purpose of manipulating the Percentile filter view.

6.5 List Filters

FIG. 3A illustrates an example graphical user interface for list filters. For purposes of illustrating an example, assume that the starting set is all the instruments in the S&P 500, and the user has selected a list filter of sector type as the first filter link in a filter chain. As a result, an instrument group that comprises 500 instruments is created.

As illustrated in FIG. 3A, a sector filter view that corresponds to the first filter link is rendered in content pane 304. In an embodiment, the sector filter view consists of a plurality of bands. Each of the bands represents a sector. For example, one of the bands is a "Financials" sector.

Each instrument in the current instrument group is assigned to one of the bands based on the instrument's value for a "sector" property. For example, if an instrument has a value of "Consumer Staples", the instrument will be assigned to a band representing "Consumer Staples" sector. When all the instruments in the current instrument group (which, in this example, is the starting set, i.e., the S&P 500) have been assigned to their respective bands, the number of each such band is determined.

As illustrated in FIG. 3A, each band comprises a block in which a number is displayed. The number represents the total number of instruments in a sector represented by the band. For example, for the "Consumer Staples" sector, a total of 39 instruments is in the sector.

In an embodiment, the user may interact with the sector filter view as presented in a graphically demarcated area to modify the list filter (e.g., of sector type). For example, the user may place a checkmark in a checkbox next to a band to select a particular sector from the current instrument group. The user may cancel the checkmark to deselect the particular sector, if so wishes. With certain sectors selected, the current instrument group is modified to include only those instruments in the selected sectors.

6.6 Smudges Filters

Figure 3G:
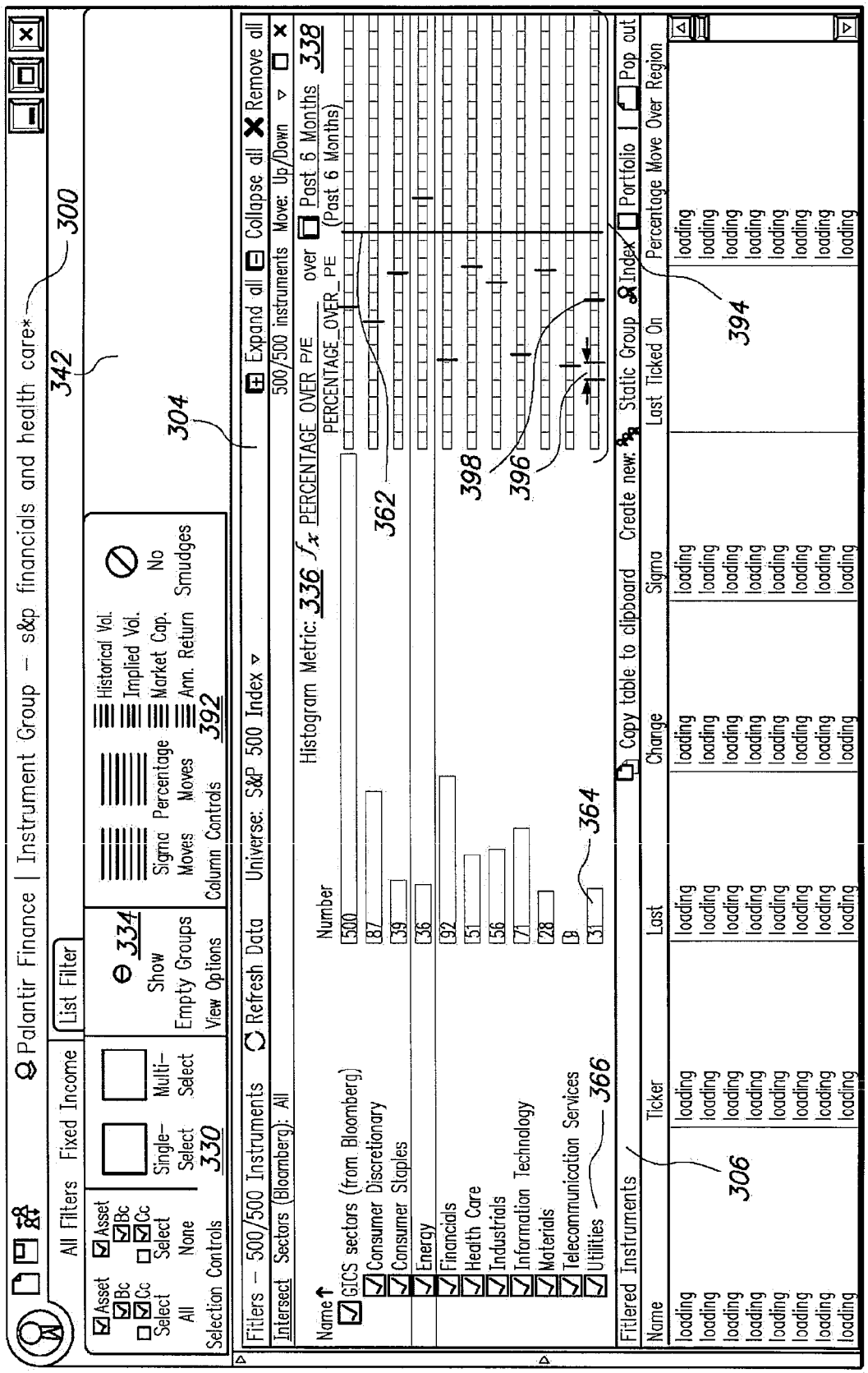
FIG. 3G illustrates an example graphical user interface for a smudges filter.

A list filter can be associated with a list filter view as shown in FIG. 3A and as described in the preceding section and in section 2.3.2. Alternatively, a list filter can also be associated with a different filter view as shown in FIG. 3G. The filter view of FIG. 3G is termed smudges filter view and can be used as an alternative visualization of the list filter.

As an example, the user selects such an alternative visualization or filter view by clicking on a "Correlations" graphical component in control pane 316 in FIG. 3A. In response to this user selection, GUI logic 122 may present an input mechanism, for example, on content pane 304 to allow the user to specify a metric to be used in the smudges filter view. Alternatively, GUI logic 122 may first render the smudges filter view with a default metric set by the data analysis system 100. The user may thereafter choose a different metric (e.g., one of the metrics shown in 392 of FIG. 3G) for the smudges filter. For the purpose of illustration, the metric selected is "PERCENTAGE OVER P/E" (336 of FIG. 3G). As illustrated in FIG. 3G, a smudges filter view is rendered in content pane 304.

In an embodiment, a smudges filter view consists of a plurality of bands having varying color saturation levels proportional to a magnitude of an entry in the list associated with the list filter. Thus each band may be used to represent an entry in the list associated with the list filter. For example, where the associated list is sectors in the S&P Index, an example smudges filter view may be rendered in content pane 304 as shown in FIG. 3G. This smudges filter view consists of a plurality of list entries for the associated list, each entry (e.g., 366 of FIG. 3G) representing a sector (i.e., the "Utilities" sector) in the S&P index. As illustrated in FIG. 3G, a list entry such as 366 may comprise a first string, which indicates a name such as "Utilities", a second string such as 364, which may be used to indicate a total number of instruments in the represented sector, and a band such as 394, which, as one of the plurality of bands, represents a distribution of instruments over the specified metric.

In some embodiments, each band in the plurality of bands in the smudges filter view provides a flattened or top-down view or visualization of a histogram for instruments in the represented sector. For example, each band 394 consists of a number of buckets. Each of these buckets is associated with a unique, non-overlapping region of values of the metric. For example, a bucket 396 on band 394 may be associated with a specific non-overlapping region of values of the metric. The magnitude of the number of values in a region of the metric may be indicated by the relative color saturation level of the associated color band.

In an embodiment, each instrument in the represented list entry (e.g., the "Utilities" sector in the sector list) is assigned to one of the buckets, such as bucket 396 of FIG. 3G, on a band, such as band 394, based on the instrument's value for the selected metric. For example, if an instrument has a metric value within the specific range for bucket 396, the instrument is assigned to bucket 396. Consequently, when all the instruments in the current list entry (e.g., the "Utilities" sector) have been assigned to their respective buckets on the band (394 of FIG. 3G), the number of each such bucket for the band is determined and referred to as a frequency value of that bucket.

A visible attribute, such as a color hue or a color saturation level, of a bucket as displayed in the band in the smudges filter view as illustrated in FIG. 3G may be determined based on the frequency value of the bucket. For example, a higher frequency value may correspond to a higher saturation of red color whereas a lower frequency value may be represented by a color band having lower saturation. Alternatively, different color hues with or without different saturation may be used to indicate frequencies of buckets. These and other ways of associating frequencies of buckets with visible attributes of buckets on a band may be used in other embodiments.

Other list entries (e.g., the "Energy" sector) may be similarly determined and rendered in content pane 304 of FIG. 3G.

View options 334 may be used to set one or more options in viewing the smudges. For example, when a "Show Zero Line" option (not shown in FIG. 3G) is selected in view options 334, a line 362 is shown in the smudges to indicate where the metric is zero. Similarly, other indications, such as mean 398 on band 394 in FIG. 3G, medium, or standard deviation may be selected to be shown in the smudges. In some embodiments, the GUI displays differences in graphic attributes of these indications to promote clarity.

To illustrate a clear example, this section has described a smudges filter view to represent histograms of list entries of a list. In an embodiment, a smudges filter view may be used for representing other types of information. For example, a smudges filter may be used to represent asset classes, or countries, rather than sectors in the S&P Index. These and other ways of using smudges filter view to visualize data may be used in various embodiments.

6.7 Treemap Filters

Figure 3H:
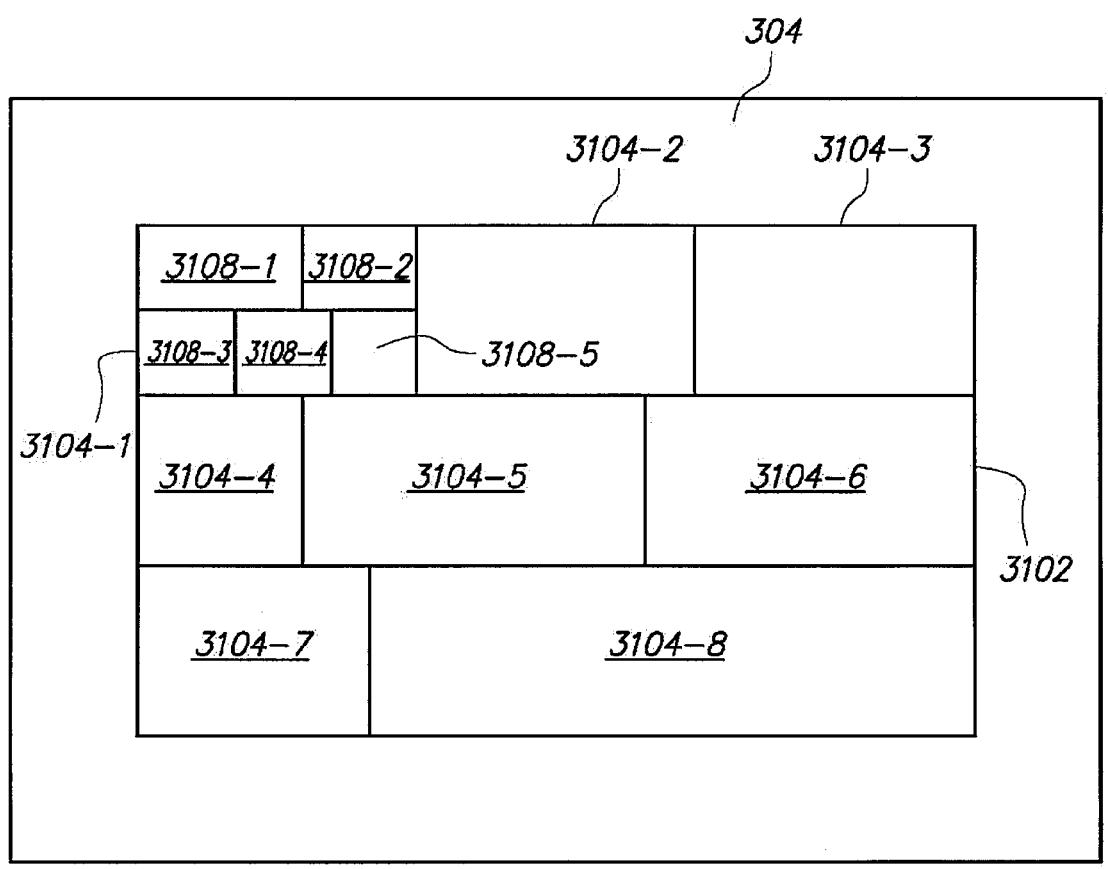
FIG. 3H illustrates an example graphical user interface related to a tree map filter.

In some embodiments, a treemap filter view as illustrated in FIG. 3H may be selected by the user. This treemap filter view may be constructed based on one or more metrics of data items (e.g., instruments) in a group (e.g., instrument group).

In an embodiment, to support constructing the treemap filter view, each instrument in the current instrument group is first assigned to, or classified into, two or more first buckets based on a value of the first metric of instruments. For the purpose of illustration, each instrument in the S&P Index may be assigned to eight such buckets based on the first metric, such as the sector metric. A size value may be associated with each of the first buckets. A size value associated with one of the first bucket may be computed based on values of the instruments in that bucket for a first metric. For example, where the first metric is market cap, values of the instruments in each of the first buckets for the market cap metric may be separately aggregated. As a result, a size value associated with each of the first buckets is determined.

In some embodiments, where a rectangle area in content pane 304 may be used to render the treemap filter view, the rectangle area may be divided into two or more first contiguous spaces, each of which represents one of the first buckets. For the purpose of illustration, a rectangle area 3102 may be used to render the treemap filter. Furthermore, the rectangle area 3102 is divided into eight first contiguous spaces 3104-1 through 3104-8, as shown in FIG. 3H. Each of the first contiguous spaces 3104 represents one of the first buckets. The size of each of the first contiguous spaces 3104 may be proportional to a sum of market cap of the instruments in the bucket represented by that first contiguous space 3104.

In some embodiments, a visible attribute, such as a color value, may be associated with each of the first buckets. The value of a visible attribute associated with one of the first bucket may be computed based on values of the instruments in that bucket for a second metric. For example, where the second metric is "PERCENTAGE OVER P/E" for "Past 6 Months", the value of a visible attribute in each of the first buckets may be separately computed based on an average value for the "Percentage Over P/E" metric, as weighed by the market cap of instruments in that first bucket. As a result, a value of a visible attribute associated with each of the first buckets is determined. The visible attribute may be represented in the treemap filter view as rendered in rectangle area 3102.

In some embodiments, one or more of the first contiguous spaces may be further divided based on a second size value and a second visible attribute. For example, where an instrument group has been divided into the first buckets based on a sector metric, one or more buckets (e.g., one or more sectors) may be further divided into one or more second buckets based on a country metric of the instruments.

In some embodiments, for each of the second buckets, a second size value and a second visible value may be computed using the same metrics that are used to compute the size values and the visible attribute values of the first buckets. Furthermore, the sizes and the visible attributes of the second buckets can be used in rendering the second buckets in the treemap filter view in a similar manner as previously described for the first buckets. For the purpose of illustration, a first bucket 3104-1 is further divided into five second buckets 3108-1 through 5.

In an embodiment, the user may interact with a treemap filter view in order to modify the instrument group. For example, the user may use a pointing device to select a portion of a treemap filter view. Data representing this user selection may be sent to the cascading filtering logic 104. The user selection indicates a new filter is to be added to the current filter chain using a set operation currently in effect. This new filter specifies a new membership criterion that an instrument must have been represented in, or alternatively must have been excluded from, the specified portion of the treemap filter view. The cascading filtering logic 104 may create a new filter chain by applying a current set operation and the new filter, as indicated in the user selection data received. This new filter chain may be applied to create a new instrument group and a new filter view.

6.8 Spectrum Filters

In some embodiments, a spectrum filter view as illustrated in FIG. 3I may be selected by the user. This spectrum filter view may be constructed based on one or more metrics of data items (e.g., instruments) in a group (e.g., instrument group).

For the purpose of constructing the spectrum filter view, a rectangle area such as 3202 of FIG. 3I is used to render the spectrum filter view in content pane 304. The rectangle area has two dimensions. The horizontal dimension of the rectangle area may be divided into as many first divisions as instruments in an instrument group, each of the first divisions representing one of the instruments. The vertical dimension of each of the first divisions representing one of the instruments may be divided into as many second divisions (e.g., 3208-i, 3210-i, 3212-i of FIG. 3I) as metrics of the instruments to be depicted in the spectrum filter view, each of the second divisions representing a type of metric for the instruments in the instrument groups. Consequently, N first divisions and M second divisions may yield a grid of N times M space divisions, and the grid may be rendered in rectangle area 3202.

A particular set of M second space divisions (e.g., 3208-i, 3210-i, 3212-i of FIG. 31), in the rectangle area, that shares a particular first division (e.g., 3206-i of FIG. 31) in the N first divisions, represents a particular data item in the N data items in the instrument group.

Figure 31:
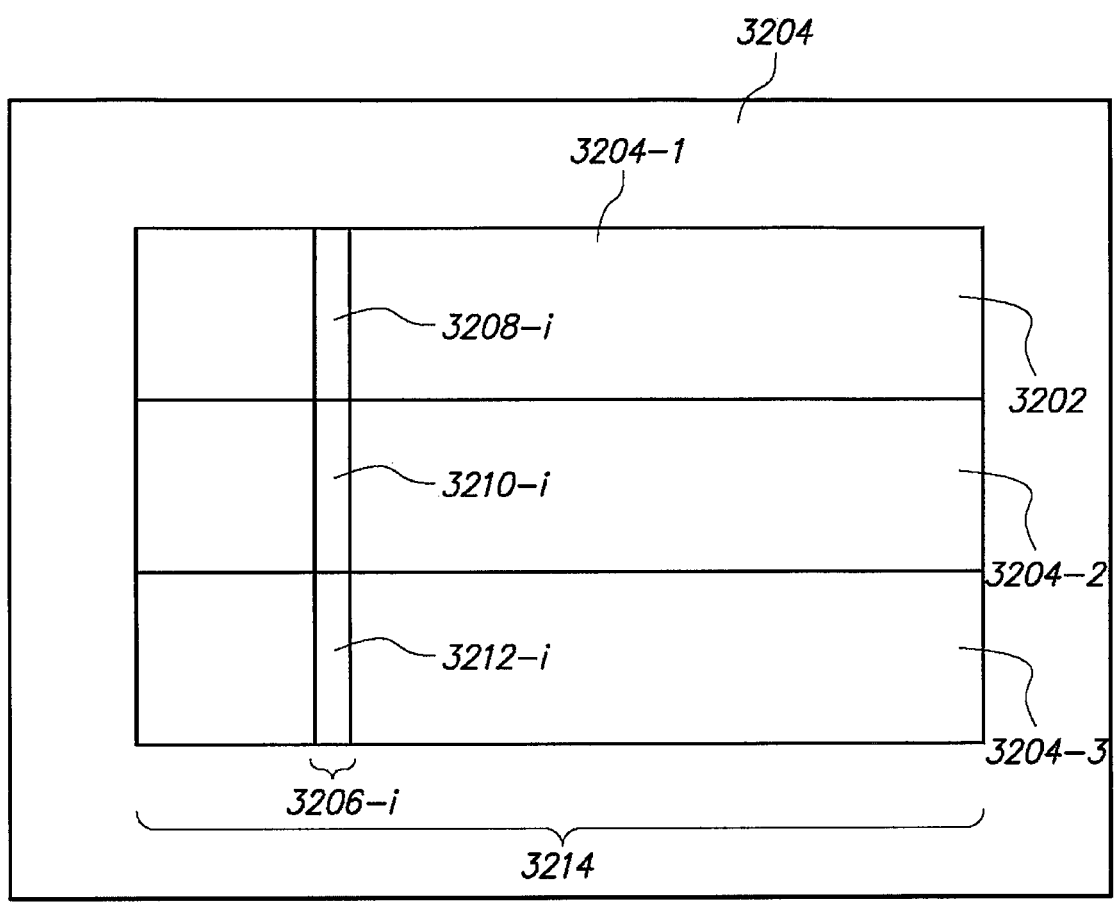

In some embodiments, visual attributes of different rectangle subareas 3204 are controlled by different metrics of the instruments. Here, each of the rectangle subareas 3204 (1 through 3 as illustrated in FIG. 31) comprises N second space divisions, representing a metric of the instruments. As an example, rectangle subarea 3204-1 may be colored blue, representing a "Percentage Over P/E" metric of the N instruments; rectangle subarea 3204-2 may be colored red, representing a market-cap metric of the N instruments; and rectangle subarea 3204-3 may be colored green, representing a sigma-move metric of the N instruments.

A visible attribute of a second space division, say 3208-i in a rectangle subarea, say 3204-1, may be determined based on an (e.g., i-th) instrument's value in a metric, say the instrument's value for the "Percentage Over P/E" metric. Thus, a higher value in the metric may be used to determine that a higher color saturation for the corresponding second space division. This visible attribute may be represented in the spectrum filter view as rendered in 3202.

In some embodiments, the instruments are represented along the horizontal direction of the spectrum filter view in a certain order. For example, the instruments may be ordered by their market caps. For example, instruments' market caps may increase along a left-to-right horizontal direction. In various embodiments, other metrics may also be used to order the placement of the instruments along the horizontal direction.

In an embodiment, the user may interact with a spectrum filter view in order to modify the instrument group. For example, the user may use a pointing device to select a portion of a spectrum filter view. This portion of the spectrum filter view may represent a new membership criterion that an instrument and the instrument's one or more metrics must fall within the specified portion. Data representing this user selection may be sent to the cascading filtering logic 104. The user selection indicates a new filter is to be added to the current filter chain using a set operation currently in effect. The cascading filtering logic 104 may create a new filter chain by applying a current set operation of "intersection" and the new filter, as indicated in the user selection data received. This new filter chain may be applied to create a new instrument group and a new filter view.

7 Common Features

In some embodiments, features common to filter views may be provided in some or all of the above discussed filter views. For example, an export option such as 352 illustrated in FIG. 3C may be used to export the data represented in a filter view such as a scatterplot. The data may be exported in various formats to a data storage element such as a local storage device attached the client 120 or a remote receiver over a network. In a particular embodiment, the data is exported in a tabular form, delimited form, XML, spreadsheet file, etc.

Another common feature may be a refresh option such as shown in FIG. 3B. This option may be useful if a user wishes to evaluate a filter chain against a universe of data items in a particular state such as the present state. In one example scenario, a user may create, edit, open or view a filter chain over an extended period of time during which the results displayed in a filter view (e.g., a Percentile view) become stale. In some embodiments, the user may select/click on the refresh option and view the results of a current evaluation of the filter chain.

It should be noted that the above common features are described for the purpose of illustration only. In various embodiments, other common features may be included in some or all of the filter views.

8 Extensions and Alternatives 8.1 Identifying Important Information

Various filter views as described herein can be used by a user to identify important information from a large set of data items with many metrics and metrics. For instance, a histogram may be used to identify a set of high performing instruments in an instrument group. As illustrated in FIG. 3B, high performing instruments may be in buckets towards the right-hand side of the filter view that have high values of the "Percentage Over P/E" metric. The user can select these high performing instruments for further studying or for further filtering. Similarly, low performing instruments towards the left-hand side of the filter view may be selected for contrasting purposes.

Similarly, a scatterplot filter view may be used to select a set of instruments that have certain values in some metrics. A scatterplot filter view may also be used to study instruments that have a specific country metric value, say instruments that have European countries as their metric values.

A treemap filter view may be used to view graphically market caps of instruments. The treemap filter view may also provide indication for a performance metric. The user may be able to determine whether a particular sector performs much better than the other sectors and whether large market cap instruments in such a sector performs better than small market cap instruments in the same sector.

A spectrum filter view provides a side-by-side display of several metrics for the user to contrast and to correlate. Since instruments in the spectrum filter view may be ordered using values of a particular metric. Visual attributes in the spectrum filter view can provide insight as to how instruments distribute along various values of the particular metric.

8.2 Dynamic Instrument Groups

For the purpose of illustrating clear examples, prior sections have stated that a filter chain may be evaluated by applying membership criteria to the universe of data items and causing a group, which may be an instrument group if data items are instruments, of data items to be selected from the universe. However, filter chains may exist independent of any particular groups of data items that are selected when these filter chains are evaluated. For example, the universe of data items may be in different states in different times. Thus, the universe of data items may be in a first state at a time when a particular filter chain is specified by the user. The universe of data items may be in a second state at a later time, and the second state may be different from the first state. For example, some data items in the universe may comprise new or updated information.

In an embodiment, definition data (or queries) at various stages of manipulation of each of one or more filter chains may be saved by the user, independent of any groups of instruments that these filter chains select from the universe of data items at the time of manipulation. Thus, at the later time when the universe of instruments is in the second state, applying a filter chain that has been created earlier may result in selecting a different group of instruments, or the same group of instruments but with different data, from the universe of data items. For example, where a group of high performing instruments is selected at an earlier time by a filter chain, a different group of high performing instruments, or the same group of high performing instruments but with different data, may be selected at a later time. Consequently, an instrument group as selected by a filter chain is dynamic, depending on the current state of the universe of instruments when the filter chain is applied.

8.3 User-Defined Filters

A user may want to add a new filter after the data analysis system 100 is in use. In an embodiment, a facility for adding one or more user-defined filters is provided by data analysis system 100.

For example, a configuration file may be modified by a user to specify a new filter to be incorporated into control area 302. In an embodiment, the user may specify in the configuration file that the new filter is to appear and be accessed in control pane 316. In an embodiment, the user may also provide executable code, linkable code, compiled code, or library code in one or more directories on the application server 102. These directories may be identified by the user in the configuration file. The code provided by the user implements the particular data filtering method that the user wants to integrate into the system.

When a data analysis session starts, the data analysis system 100 may render all the filters that are to be presented in the graphic user interface. At a user's selection, the data analysis system 100 may dynamically create the new filter based on reading the configuration file and using the code specified by the user. In one embodiment, programmatic reflection techniques may be used to dynamically load classes that form an implementation of the new filter. As a result of dynamic incorporation of user-provided filter code, a user-defined filter can be made available on GUI 300 for specifying one or more membership criteria in data analysis sessions.

Data analysis according to the techniques described herein is not limited to any particular tool or any particular type of analysis. Thus, the examples of data analysis provided herein are to be regarded in an illustrative rather than a restrictive sense.

9 Example Implementation Hardware

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
    creating and storing in computer memory a filter chain object comprising an association of a starting set of data items and two or more filter links;
    wherein each of the filter links comprises a set operation and a membership criterion;
    wherein an individual filter link of the two or more filter links is joined to others of the two or more filter links with an individual set operation specified in the individual filter links;
    wherein each of the filter links is associated with a particular filter view among a plurality of filter views, and wherein each particular filter view comprises a graphical representation of a state of applying the membership criterion of the associated filter link to a subset of data resulting from filtering the starting set of data items according to zero or more preceding filter links;
    receiving user input representing an interaction with a first particular filter view, and modifying the membership criterion that is associated with the first particular filter view in response to the user input.

2. The method of claim 1, wherein the first particular filter view comprises a histogram view that is associated with a histogram filter link, wherein the user input comprises a selection of a range of an axis of the histogram view, and wherein the modifying comprises changing the membership criterion of the histogram filter link to comprise the selected range.

3. The method of claim 1, wherein the particular filter view is a histogram view.

4. The method of claim 1, wherein the particular filter view is a scatterplot view.

5. The method of claim 1, wherein the particular filter view is a timeline view.

6. The method of claim 1, wherein the particular filter view is a percentile view.

7. The method of claim 1, wherein the particular filter view is a treemap view.

8. The method of claim 1, wherein the particular filter view is a spectrum view.

9. The method of claim 1, wherein the particular filter view is a list view.

10. The method of claim 1, wherein the particular filter view is a list view that is associated with a list filter link and comprising a graphical display of a bar or a number for each data item in a list shown in the list view.

11. The method of claim 10, wherein each bar or number represents a quantity of each of the data items in the list.

12. The method of claim 11, wherein the particular filter view is a smudges view and wherein the bar has a color saturation level that is proportional to the magnitude of the quantity.

13. The method of claim 1, further comprising receiving second user input that defines the set operation, the membership criterion, or the graphical representation.

14. The method of claim 1, wherein the data items that are in the starting set of data items may change over time.

15. The method of claim 1, wherein each filter link is associated with a table of a second subset of the data items resulting from filtering the starting set of data items according to all the filter links.

16. The method of claim 1, wherein the data items represent tradable financial instruments.

17. A machine-readable storage medium comprising one or more program instructions recorded thereon, which instructions, when executed by one or more processors, cause the one or more processors to perform the steps of:
    creating and storing in computer memory a filter chain object comprising an association of a starting set of data items and two or more filter links;
    wherein each of the filter links comprises a set operation and a membership criterion;
    wherein an individual filter link of the two or more filter links is joined to others of the two or more filter links with an individual set operation specified in the individual filter link;
    wherein each of the filter links is associated with a particular filter view among a plurality of filter views, and wherein each particular filter view comprises a graphical representation of a state of applying the membership criterion of the associated filter link to a subset of data resulting from filtering the starting set of data items according to zero or more preceding filter links;
    receiving user input representing an interaction with a first particular filter view, and modifying the membership criterion that is associated with the first particular filter view in response to the user input.

18. The storage medium of claim 17, wherein the first particular filter view comprises a histogram view that is associated with a histogram filter link, wherein the user input comprises a selection of a range of an axis of the histogram view, and wherein the modifying comprises changing the membership criterion of the histogram filter link to comprise the selected range.

19. The storage medium of claim 17, wherein the particular filter view is a histogram view.

20. The storage medium of claim 17, wherein the particular filter view is a scatterplot view.

21. The storage medium of claim 17, wherein the particular filter view is a timeline view.

22. The storage medium of claim 17, wherein the particular filter view is a percentile view.

23. The storage medium of claim 17, wherein the particular filter view is a treemap view.

24. The storage medium of claim 17, wherein the particular filter view is a spectrum view.

25. The storage medium of claim 17, wherein the particular filter view is a list view.

26. The storage medium of claim 17, wherein the particular filter view is a list view that is associated with a list filter link and comprising a graphical display of a bar or a number for each data item in a list shown in the list view.

27. The storage medium of claim 26, wherein each bar or number represents a quantity of each of the data items in the list.

28. The storage medium of claim 27, wherein the particular filter view is a smudges view and wherein the bar has a color saturation level that is proportional to the magnitude of the quantity.

29. The storage medium of claim 17, further comprising receiving second user input that defines the set operation, the membership criterion, or the graphical representation.

30. The storage medium of claim 17, wherein the data items that are in the starting set of data items may change over time.

31. The storage medium of claim 17, wherein each filter link is associated with a table of a second subset of the data items resulting from filtering the starting set of data items according to all the filter links.

32. The storage medium of claim 17, wherein the data items represent tradable financial instruments.

33. A computer-based apparatus comprising:
means for creating and storing in computer memory a filter chain object comprising an association of a starting set of data items and two or more filter links;
wherein each of the filter links comprises a set operation and a membership criterion;
wherein an individual filter link of the two or more filter links is joined to others of the two or more filter links with an individual set operation specified in the individual filter link;
wherein each of the filter links is associated with a particular filter view among a plurality of filter views, and wherein each particular filter view comprises a graphical representation of a state of applying the membership criterion of the associated filter link to a subset of data resulting from filtering the starting set of data items according to zero or more preceding filter links;
receiving user input representing an interaction with a first particular filter view, and modifying the membership criterion that is associated with the first particular filter view in response to the user input.

34. An application server comprising:
a network interface that is coupled to a data network for receiving one or more packet flows therefrom;
a processor; and
one or more stored program instructions which, when executed by the processor, cause the processor to carry out the steps of:
creating and storing in computer memory a filter chain object comprising an association of a starting set of data items and two or more filter links;
wherein each of the filter links comprises a set operation and a membership criterion;
wherein an individual filter link of the two or more filter links is joined to others of the two or more filter links with an individual set operation specified in the individual filter link;
wherein each of the filter links is associated with a particular filter view among a plurality of filter views, and wherein each particular filter view comprises a graphical representation of a state of applying the membership criterion of the associated filter link to a subset of data resulting from filtering the starting set of data items according to zero or more preceding filter links;
receiving user input representing an interaction with a first particular filter view, and modifying the membership criterion that is associated with the first particular filter view in response to the user input.

35. The application server of claim 34, wherein the first particular filter view comprises a histogram view that is associated with a histogram filter link, wherein the user input comprises a selection of a range of an axis of the histogram view, and wherein the modifying comprises changing the membership criterion of the histogram filter link to comprise the selected range.

36. The application server of claim 34, wherein the particular filter view is a histogram view.

37. The application server of claim 34, wherein the particular filter view is a scatterplot view.

38. The application server of claim 34, wherein the particular filter view is a timeline view.

39. The application server of claim 34, wherein the particular filter view is a percentile view.

40. The application server of claim 34, wherein the particular filter view is a treemap view.

41. The application server of claim 34, wherein the particular filter view is a spectrum view.

42. The application server of claim 34, wherein the particular filter view is a list view.

43. The application server of claim 34, wherein the particular filter view is a list view that is associated with a list filter link and comprising a graphical display of a bar or a number for each data item in a list shown in the list view.

44. The application server of claim 43, wherein each bar or number represents a quantity of each of the data items in the list.

45. The application server of claim 44, wherein the particular filter view is a smudges view and wherein the bar has a color saturation level that is proportional to the magnitude of the quantity.

46. The application server of claim 34, further comprising receiving second user input that defines the set operation, the membership criterion, or the graphical representation.

47. The application server of claim 34, wherein the data items that are in the starting set of data items may change over time.

48. The application server of claim 34, wherein each filter link is associated with a table of a second subset of the data items resulting from filtering the starting set of data items according to all the filter links.

49. The application server of claim 34, wherein the data items represent tradable financial instruments.

* * * * *

UNITED STATES PATENT AND TRADEMARK OFFICE
CERTIFICATE OF CORRECTION

| | | |
|---|---|---|
| PATENT NO. | : 8,041,714 B2 | Page 1 of 1 |
| APPLICATION NO. | : 12/210921 | |
| DATED | : October 18, 2011 | |
| INVENTOR(S) | : Andrew Aymeloglu et al. | |

It is certified that error appears in the above-identified patent and that said Letters Patent is hereby corrected as shown below:

Claim 17, Column 24, Line 58, between the and filter insert --other--

Signed and Sealed this
Twentieth Day of December, 2011

David J. Kappos
*Director of the United States Patent and Trademark Office*